(12) United States Patent
Donegan et al.

(10) Patent No.: US 10,785,961 B2
(45) Date of Patent: Sep. 29, 2020

(54) BIRD FEEDER PERCH EXTENSION

(71) Applicant: Classic Brands, LLC, Denver, CO (US)

(72) Inventors: Robert Donegan, Denver, CO (US); Scott Colwell, Foster, RI (US); Betsy Puckett, Plainfield, CT (US); Stephen Combs, Denver, CO (US); Lindsey Nifong, Denver, CO (US); Scott Merritt, Newmarket (CA)

(73) Assignee: Classic Brands, LLC, Denver, CO (US)

( * ) Notice: Subject to any disclaimer, the term of this patent is extended or adjusted under 35 U.S.C. 154(b) by 120 days.

(21) Appl. No.: 16/107,830

(22) Filed: Aug. 21, 2018

(65) Prior Publication Data

US 2019/0000045 A1 Jan. 3, 2019

Related U.S. Application Data

(63) Continuation-in-part of application No. 14/842,681, filed on Sep. 1, 2015, now Pat. No. 10,051,842.

(60) Provisional application No. 62/044,538, filed on Sep. 2, 2014.

(51) Int. Cl.
*A01K 39/01* (2006.01)
*A01K 31/12* (2006.01)

(52) U.S. Cl.
CPC .............. *A01K 31/12* (2013.01); *A01K 39/01* (2013.01)

(58) Field of Classification Search
CPC ...... A01K 31/12; A01K 39/01; A01K 39/012; A01K 31/06
USPC ............... 119/468, 467, 531, 537, 52.2, 57.8
See application file for complete search history.

(56) References Cited

U.S. PATENT DOCUMENTS

| | | | | |
|---|---|---|---|---|
| 5,215,039 A | * | 6/1993 | Bescherer | A01K 39/012 119/468 |
| 5,588,397 A | * | 12/1996 | Johnakin, III | A01K 31/12 119/468 |
| 6,374,772 B1 | * | 4/2002 | Brandt | A01K 31/12 119/466 |
| 6,543,383 B1 | * | 4/2003 | Cote | A01K 39/012 119/52.2 |
| 7,093,561 B2 | * | 8/2006 | Rich | A01K 39/012 119/57.8 |
| 7,448,346 B1 | * | 11/2008 | Stone | A01K 31/12 119/52.3 |
| 2017/0231202 A1 | * | 8/2017 | Cote | A01K 39/012 119/57.8 |

* cited by examiner

*Primary Examiner* — Trinh T Nguyen
(74) *Attorney, Agent, or Firm* — Polsinelli P.C.

(57) ABSTRACT

A perch extension for a bird feeder having an elongated perch body that defines a cavity that is adapted to fit at least partially over a perch on a bird feeder. The perch extension may optionally have a support member that is coupled to the perch body, and is further adapted to fit at least partially around the seed container of the bird feeder. The perch extension may optionally define protuberances to provide a snap-fit or press-fit engagement with the bird feeder perch.

13 Claims, 22 Drawing Sheets

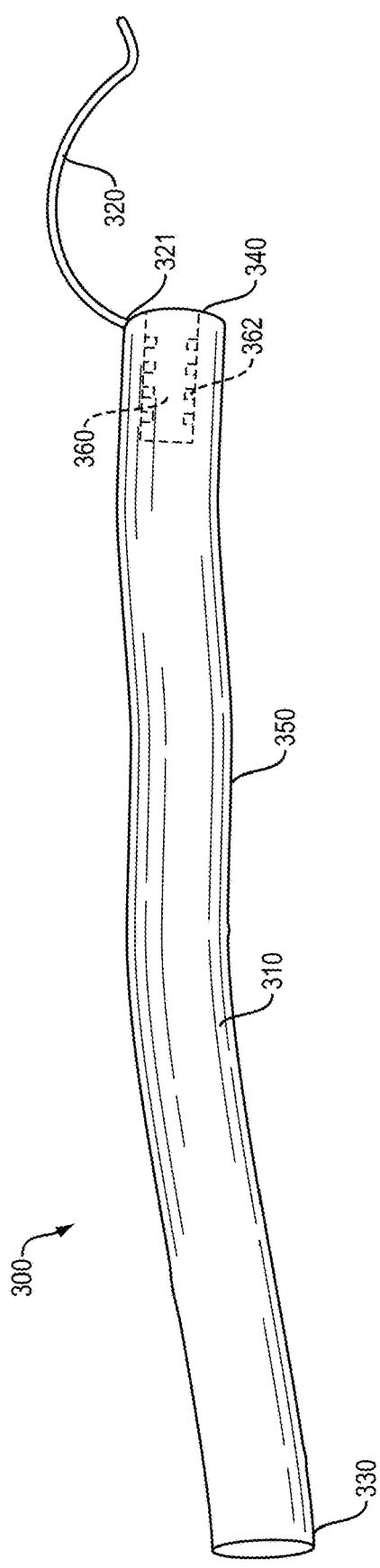
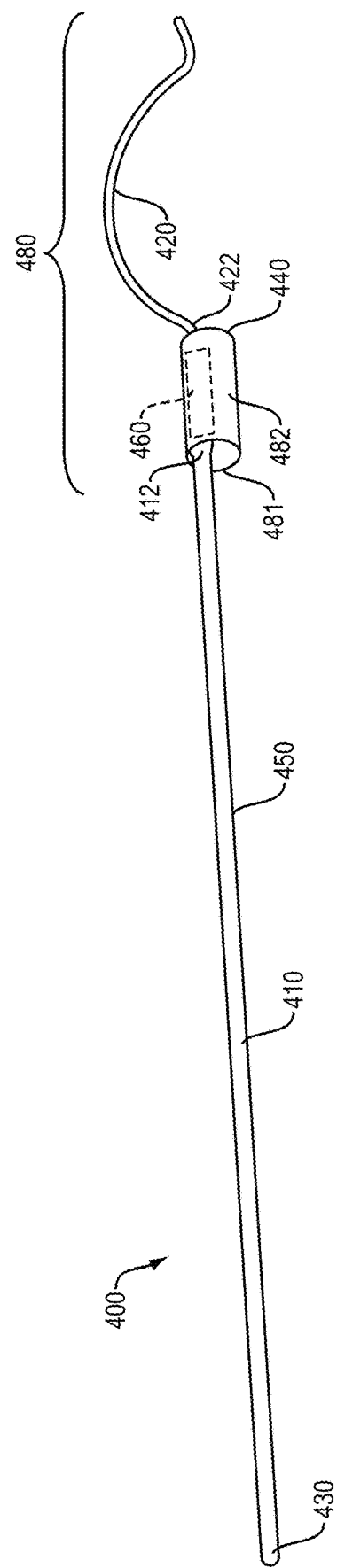
FIG. 3A
FIG. 3B

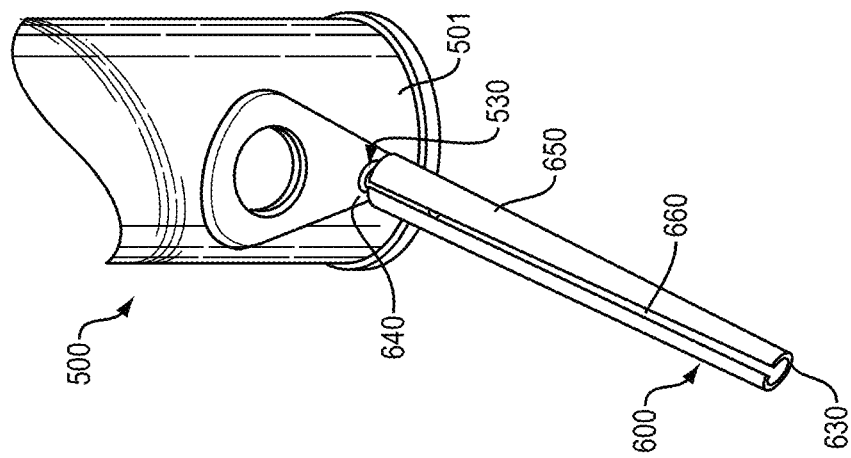
FIG. 6C
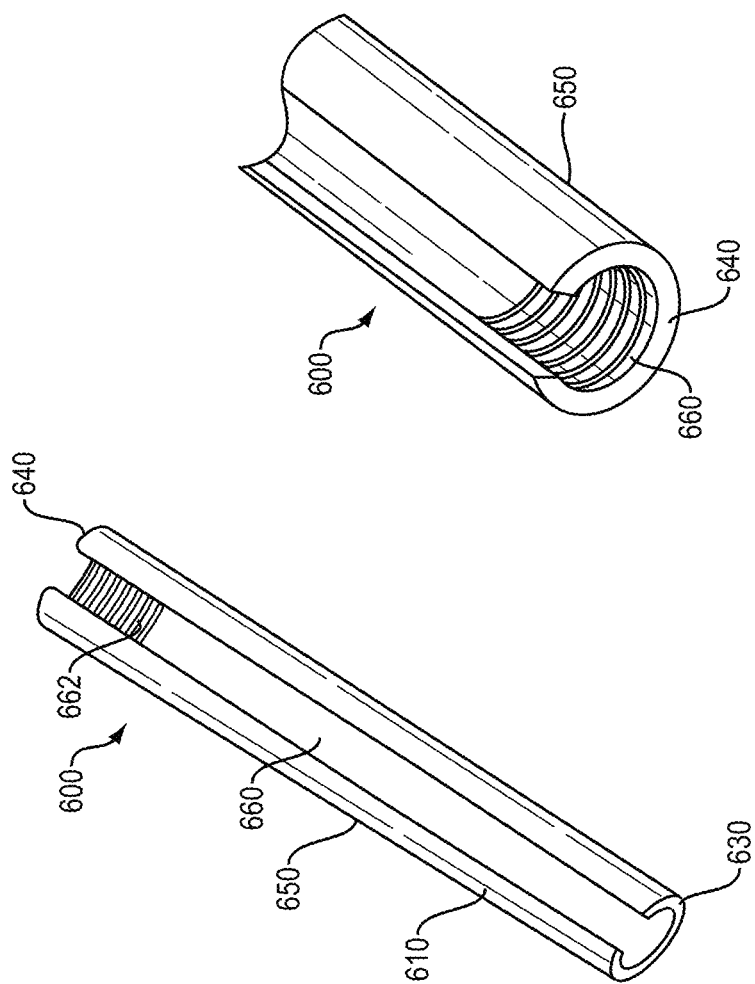
FIG. 6B
FIG. 6A

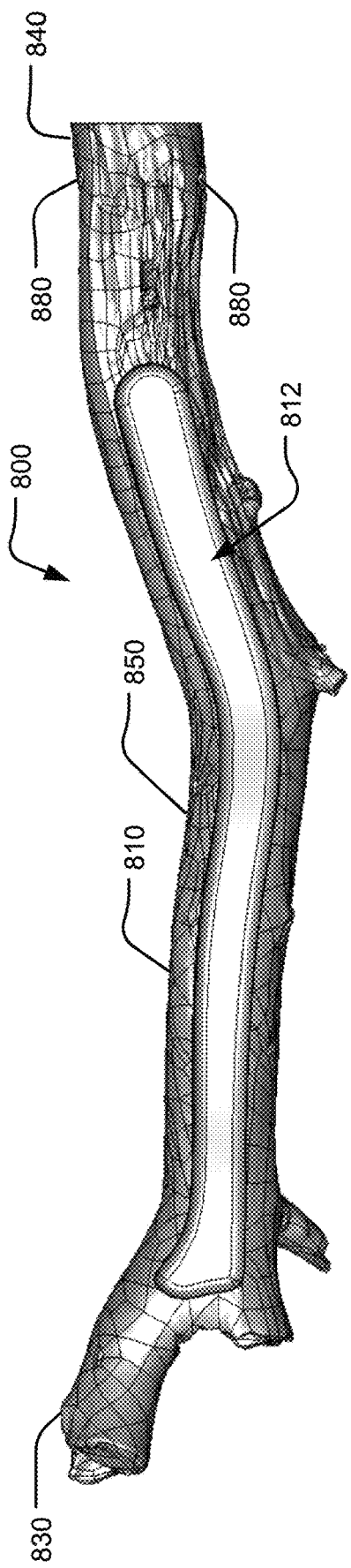
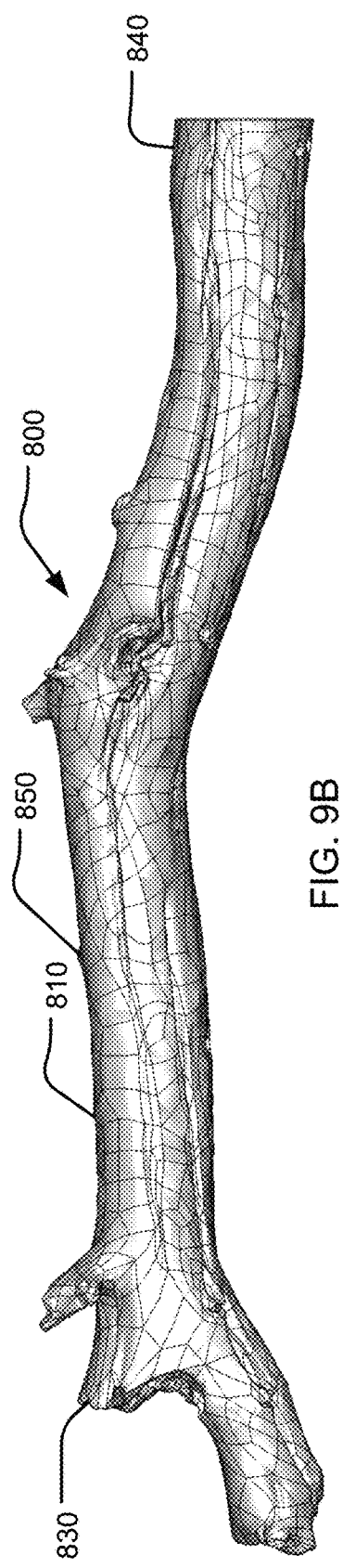
FIG. 9A
FIG. 9B

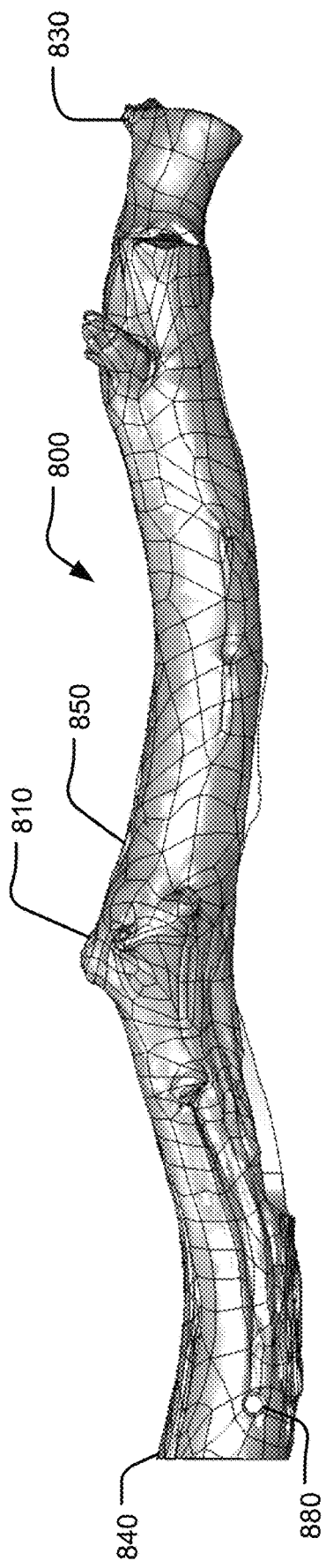
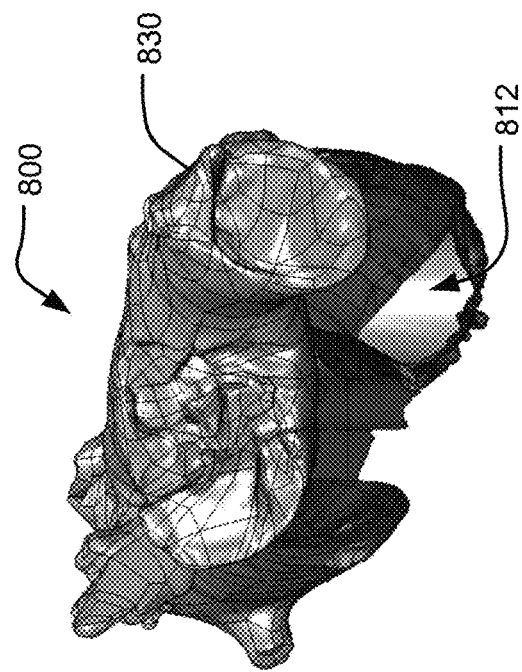
FIG. 10A
FIG. 10C
FIG. 10B

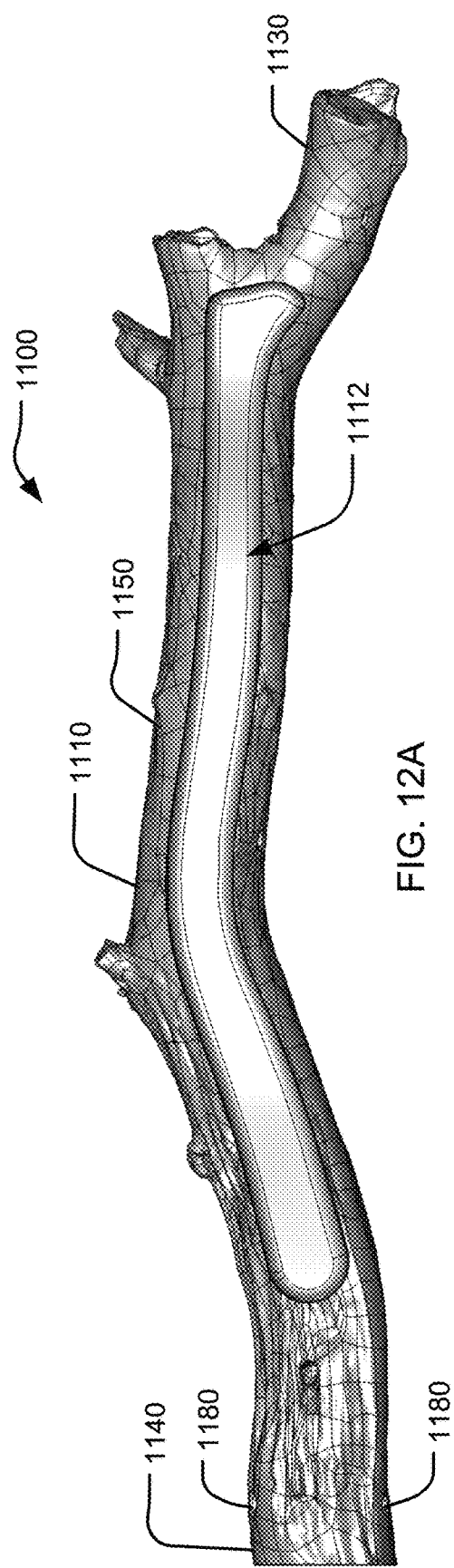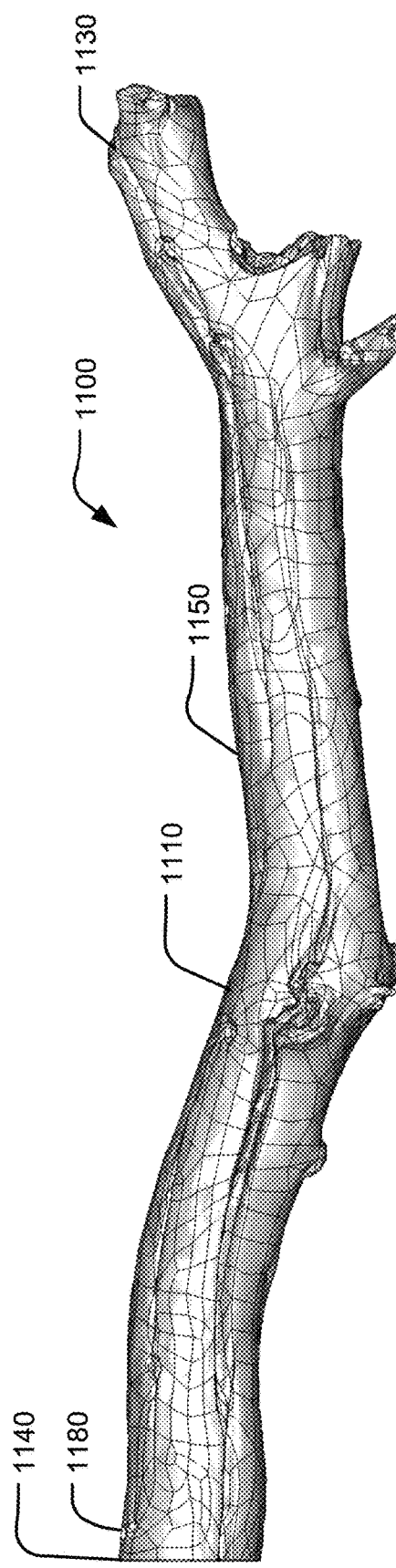

US 10,785,961 B2

BIRD FEEDER PERCH EXTENSION

CROSS REFERENCE TO RELATED APPLICATIONS

The present application is a continuation-in-part of U.S. patent application Ser. No. 14/842,681, entitled "Bird Feeder Perch Extension" and filed on Sep. 1, 2015. This application claims priority to U.S. Provisional Application Ser. No. 62/044,538, entitled "Bird Feeder Perch Extension" and filed on Sep. 2, 2014. Each of these applications is incorporated by reference in their entirety herein.

TECHNICAL FIELD

The present disclosure relates to bird feeders, and specifically to removable bird feeder perch extensions that increase the available landing area for perching and feeding.

BACKGROUND

Many bird feeders have one or more perches where a bird may land and rest upon as the bird eats from the feeder. One such prior art bird feeder is shown in FIG. 1. This drawing is taken from U.S. Pat. No. 7,237,507, issued on Jul. 3, 2007. As shown in FIG. 1, bird feeder 12 includes a base 30, seed baffle 32 and a seed housing 34 that together define a seed compartment or container 36. Seed housing 34 is a substantially cylindrical tube. Seed housing 34 includes at least one aperture 38 through which birds may access seed contained therein from external perches 40. Another such prior art bird feeder is shown in FIG. 2. This drawing is taken from U.S. Pat. No. 7,946,248, issued on May 24, 2011. As shown in FIG. 2, bird feeder 50 comprises elongated seed tube or container 10, base 100, diverter 90, cover 20, and three pairs of feeder ports 52a and 52b, 152a and 152b, and 252a and 252b. Feeder port 52a is representative of all the feeder ports, and comprises an external perch 80.

Many species of birds, when using the short perches on these prior art feeders, such as perches 40 and 80 in FIGS. 1 and 2, respectively, will take a seed and fly off to a nearby tree or bush, out of sight, to open the seed and consume the de-hulled kernel. When the perches are longer, however, some bird species will take a seed, hop down the length of the perch to remove it from the hull, eat the kernel, and then return to the feeder port. The longer perches thus encourage the birds to stay at the feeder longer. This in turn results in greater bird visibility for bird watchers, improving the bird feeding experience.

Manufacturing bird feeders with longer fixed perches, however, creates distribution issues, because the longer perches require larger containers, which increases packaging and shipping costs. In addition, consumers wishing to take advantage of the longer perches would need to replace their existing feeders, which is costly and inconvenient.

It is with these observations in mind, among others, that various aspects of the present disclosure were conceived and developed.

SUMMARY

Implementations described and claimed herein address the foregoing observations by providing systems and methods for perch extension for a bird feeder. In one implementation, an elongated body extends along a length from a first end to a second end, and an opening is defined in the elongated body at the second end. A mounting cavity is defined in the elongated body. The mounting cavity is in communication with the opening and extends at least partially along the length of the elongated body. An external surface extends about the length of the body. The external surface has an extended surface area. The elongated body is engageable to the perch in an extended arrangement including the perch extending through the opening into the mounting cavity. The extended arrangement forms a landing surface area including at least the external surface area. The landing surface area is greater in size than the perch surface area.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIG. 3A is a perspective view of a bird feeder perch extension in accordance with an example implementation;

FIG. 3B is a perspective view of another bird feeder perch extension;

FIG. 6A is a perspective view of another bird feeder perch extension;

FIG. 6B is a partial perspective view of the bird feeder perch extension of FIG. 6A;

FIG. 6C is a partial perspective view of the bird feeder perch extension of FIG. 6A mounted on a bird feeder;

FIG. 9A is a bottom view of the bird feeder perch extension of FIG. 8A;

FIG. 9B is a top view of the bird feeder perch extension of FIG. 8A;

FIG. 10A is a back view of the bird feeder perch extension of FIG. 8A;

FIG. 10B is a left view of the bird feeder perch extension of FIG. 8A;

FIG. 10C is a right view of the bird feeder perch extension of FIG. 8A;

FIG. 12A is a bottom view of the bird feeder perch extension of FIG. 11A;

FIG. 12B is a top view of the bird feeder perch extension of FIG. 11A;

DETAILED DESCRIPTION

Figure 1:
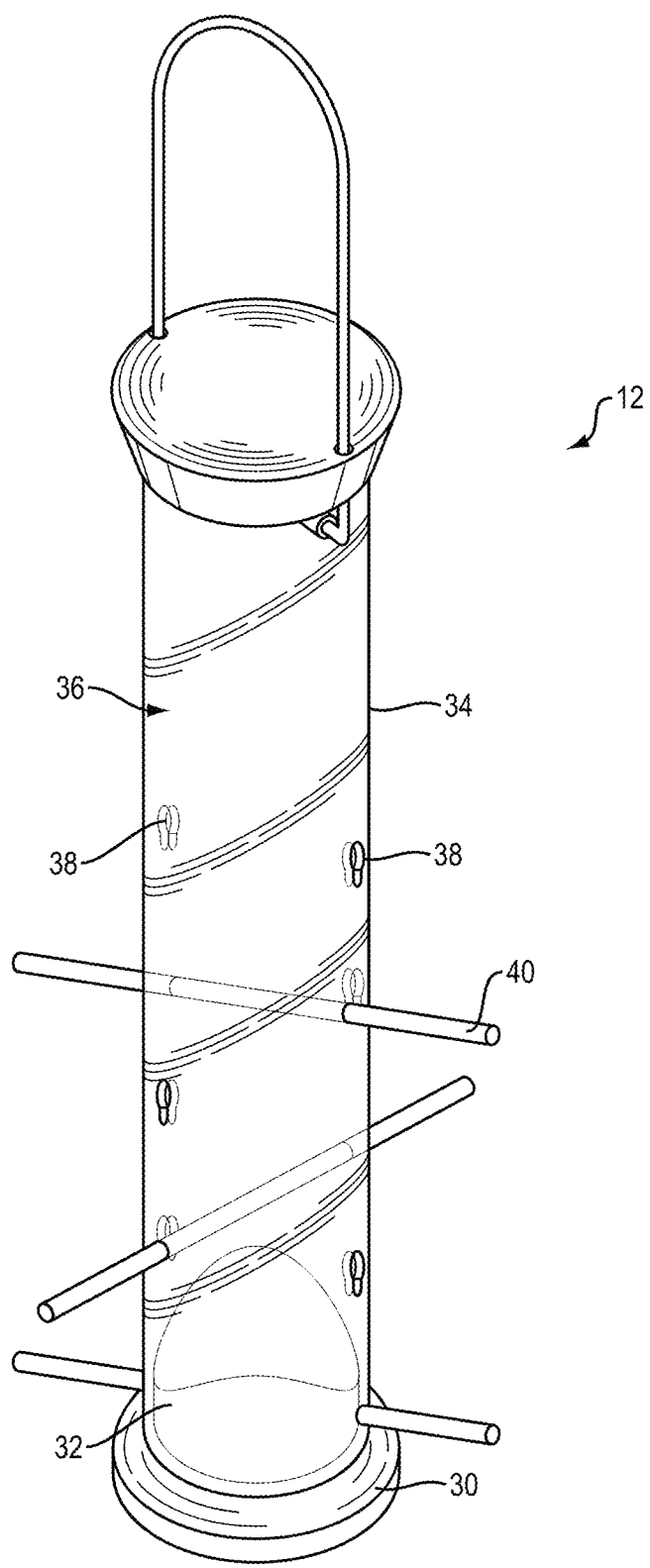
FIG. 1 is a perspective view of a first prior art bird feeder.

Aspects of the presently disclosed technology provide systems and methods of selectively extending the length of one or more bird feeder perches to accommodate a bird's natural foraging behavior. Such systems and methods provide removable perch extensions that could be included as part of a complete bird feeder accessory package without requiring significantly larger containers. Alternatively, such systems and methods would be available individually or as a set to retrofit existing bird feeders. Such perch extensions may be easily attached or detached by the consumer as desired.

In one aspect, a perch extension for a bird feeder including one or more perches each having a perch surface area and a perch length. The perch extension includes an elongated body extending along a length from a first end to a second end. The elongated body may be made from a variety of materials and have a variety of shapes, sizes, and features. For example, the elongated body may extend linearly along the length or the length may extend along one or more contours. The elongated body may extend along the length in a direction away from the bird feeder, such that the second end is disposed proximate to the bird feeder and the first end is disposed distal to the bird feeder. Alternatively, the elongated body may extend along one or more contours, such that the second end is disposed at the bird feeder and the elongated body loops back to the first end, which is also disposed at the bird feeder. More particularly, the elongated body may be connected to the bird feeder at both the first end and the second end or just the second end.

An opening is defined in the elongated body at the second end. The opening may be defined in a face of the second end that extends traverse to the length of the elongated body. The face may be planar, contoured, angled, and/or the like. A mounting cavity is defined in the elongated body and is in communication with the opening. The mounting cavity extends at least partially along the length of the elongated body. The mounting cavity may be completed enclosed within the elongated body, open at least partially through the elongated body defining a channel, extend from the first end to the second end, extend only partially from the opening along the length of the elongated body, one of a plurality of mounting cavities defined in the elongated body, and/or the like.

An external surface extends about the length of the elongated body. The external surface may: be continuous or broken; have one or more openings, depressions, protrusions, or other surface features; have various textures, shapes, contours, or angles; and any combination thereof. The external surface may completely enclose the mounting cavity or have one or more openings into the mounting cavity. For example, the external surface may have a continuous opening into the mounting cavity from the opening at the second end to form a channel. As another example, the mounting cavity may be a groove defined in the external surface or otherwise open, such that the external surface operates as a cover over the perch. The external surface may be smooth, uniform, non-uniform, textured, contoured, angled, and/or have various ornamental features. In one aspect, the external surface has a shape mimicking a tree branch. The external surface has an external surface area.

The elongated body of the perch extension is engageable to the perch in an extended arrangement. The elongated body may be engaged to the perch by receiving the perch through the opening at the second end into the mounting cavity. The perch may be engaged within the mounting cavity through a friction fit engagement, a snap-fit engagement, a mechanical engagement, a magnetic engagement, and/or the like. The perch may be engaged to the elongated body, such that it is removable. In the extended arrangement, the perch extends through the opening into the mounting cavity, forming a landing surface area that includes at least the external surface area of the elongated body and may include at least a portion of the perch surface area and/or a surface area of other bird feeder components. The landing surface area is greater than the perch surface area.

In some aspects, multiple perch extenders are provided each including these features. The elongated body of one perch extender may be releasably connected or otherwise fixed to a reservoir of the bird feeder and/or an elongated body of another perch extender using a support member. An aperture may be defined in the elongated body at the second end, for example in the face of the second end, in a side of the elongated body at the second end, and/or elsewhere. The aperture may be engageable to a hook or other feature of the support member.

In some aspects, a single perch extender may connect to and extend a plurality of perches. The first end and the second end of the elongated body may each include an opening into a mounting cavity. Each mounting cavity receives a respective perch through the opening. The mounting cavities may be separate or form a continuous mounting cavity from the first end to the second end. Generally, each perch may be releaseably engaged to a separate perch extender or to a portion of a common perch extender, providing an expanded landing area for birds utilizing the bird feeder.

As a result of the releasable engagement of the perch extenders to the perches, the length of each perch is extended, the surface area of each perch is expanded, and birds spend longer on the perch at the bird feeder. Further, the perch extension may be hollow or include depressions or other features making it lightweight and easy to manufacture. The perch extensions may be used with any bird feeder so as not to impact the distribution of the bird feeders or require the purchase of a new bird feeder. The perch extensions may be sold as a kit including one or more perch extensions, a support member, and/or other accessories. It will be appreciated that there are many implementations of the presently disclosed technology providing perch extension. The Figures illustrates various non-limiting examples of these implementations.

Figure 4B:
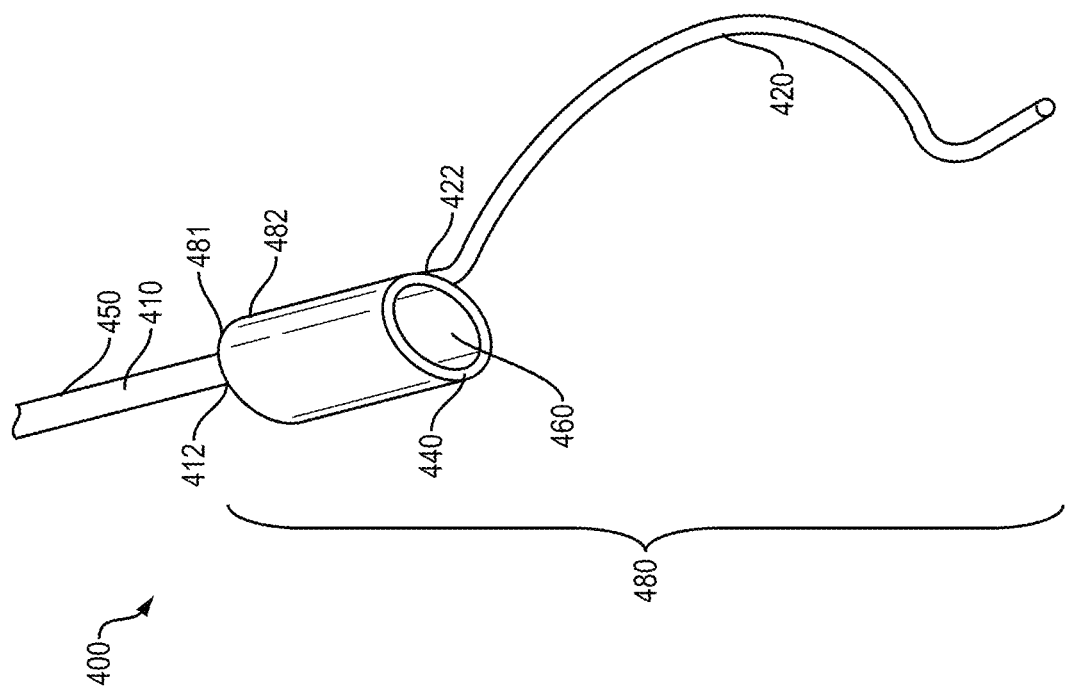
FIG. 4B is a partial perspective view of the bird feeder perch extension of FIG. 3B.
Figure 4A:
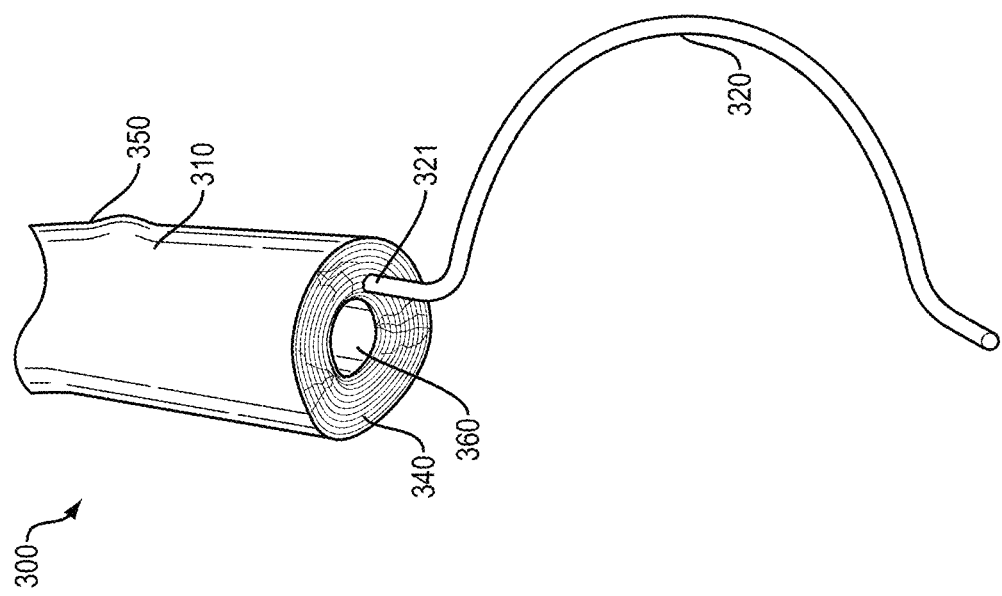
FIG. 4A is a partial perspective view of the bird feeder perch extension of FIG. 3A.

With reference first to FIGS. 3A and 4A, a bird feeder perch extension 300 comprises an elongated perch body 310 and an optional, substantially semi-circular support member 320. In other implementations, optional support member 320 may define a curve shape with a non-zero curvature.

Perch body 310 defines a tip 330 at a first end, a base 340 at the substantially longitudinally opposite second end, and an outer surface 350 that provides a landing surface to allow one or more birds to rest and position themselves for feeding.

Perch body 310 is at least partially hollow and defines a mounting cavity 360 open at the base 340. As discussed in detail below, mounting cavity 360 has a shape that is adapted or configured to fit at least partially over a bird feeder perch, such as the prior art perches 40 and 80 in FIGS. 1 and 2, respectively.

A first end 321 of support member 320 is coupled to perch body 310 proximate perch body base 340. Support member 320 may be removably coupled to perch body 310 with a snap-fit or press-fit engagement. As discussed in detail below, support member 320 is sized to fit at least partially around bird feeder seed tubes or containers, such as prior art bird feeder seed tubes 34 and 10 in FIGS. 1 and 2, respectively.

Figure 2:
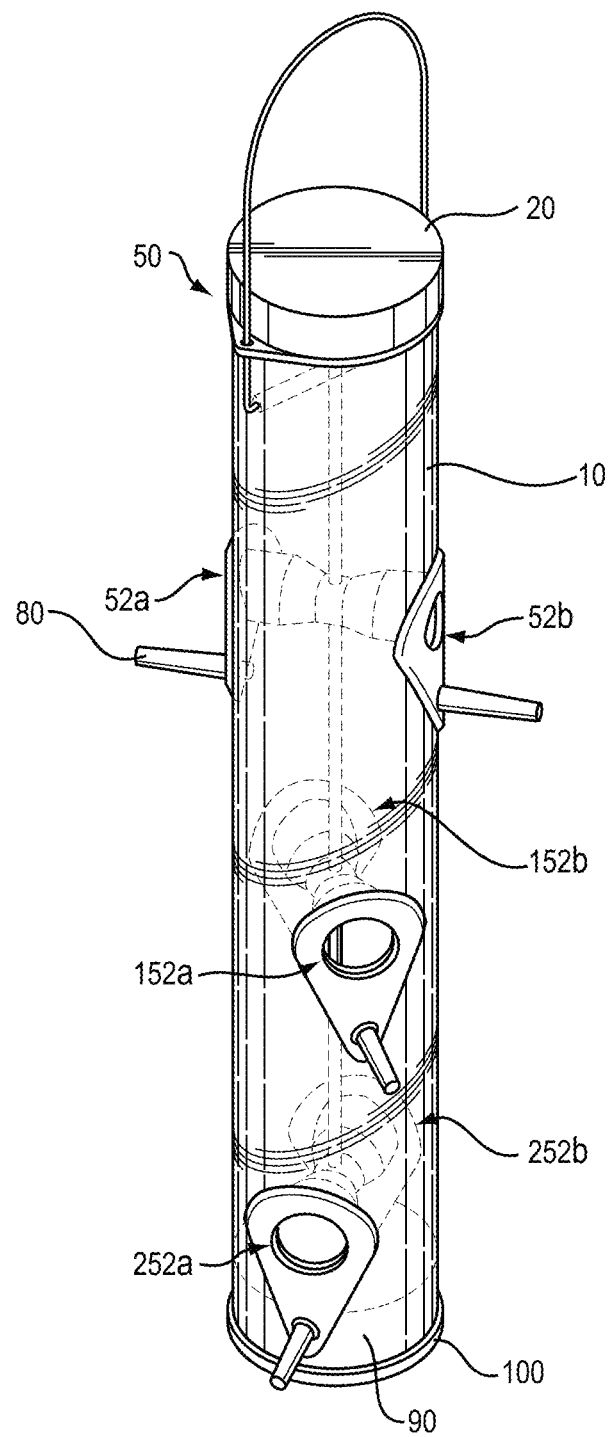
FIG. 2 is a perspective view of a second prior art bird feeder.
Figure 5:
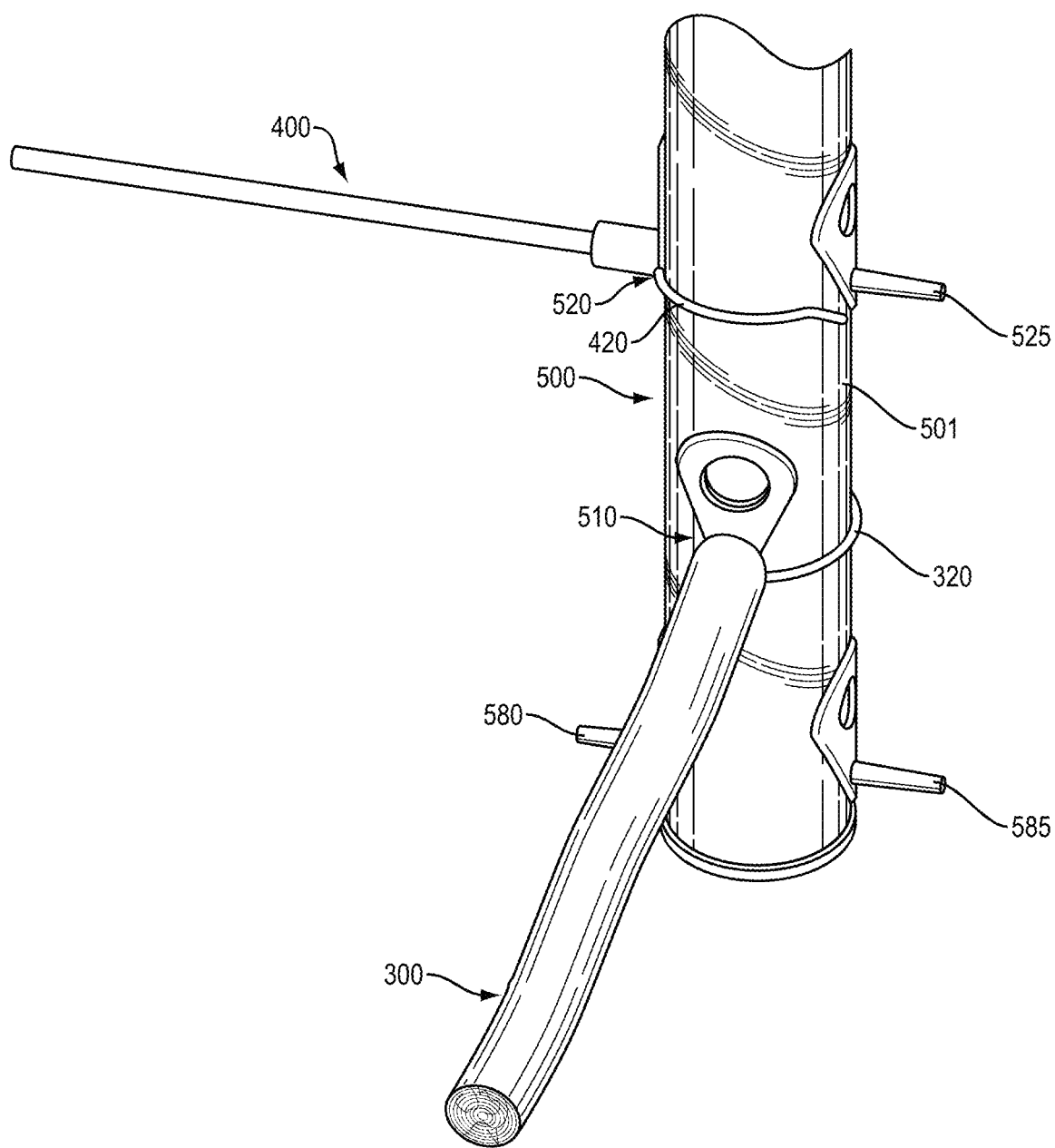
FIG. 5 is a partial perspective view of the bird feeder extensions of FIGS. 3A and 4A mounted on a bird feeder.

Bird feeder perch extension 300 is configured to be attached to, and detached from, a bird feeder, such as the prior art bird feeders 12 and 50 in FIGS. 1 and 2, respectively, described above. As shown in FIG. 5, bird feeder 500 comprises bird feeder perches at perch locations 580, 585, 510, 520 and 525, and bird feeder perch extension 300 is removably coupled to bird feeder 500 at perch location 510. Note that the particular bird feeder used in this example is not a limitation, and that the bird feeder perch extensions may be adapted or configured for use with tubular bird feeders of varying length and diameter having protruding perches. In addition, and as described above, support member 320 is optional, such that the bird feeder perch extensions may also be adapted or configured for use with non-tubular bird feeders having protruding perches.

With further reference to FIG. 5, the perch at location 510 is at least partially contained within the mounting cavity 360 of bird feeder perch extension 300. In one implementation, the interior length of mounting cavity 360 is sufficient to contain substantially the entire length of the perch at location 510, such that base 340 of perch body 310 is in contact with the outer surface of bird feeder tube 501.

In addition, in one implementation, mounting cavity 360 is adapted or configured to have a shape that is substantially similar to the perch at location 510, such that the perch fits closely or snugly within the mounting cavity. Mounting cavity 360 further defines an internal circumference that is slightly larger than the external circumference of the perch, such that the perch fits closely or snugly within the mounting cavity 360. In one implementation, perch body 310 may further comprise ribs, knurls or other protuberances, such as the protuberances 362 that extend into the mounting cavity 360, as shown in FIG. 3A, to further secure the fit between the mounting cavity and the perch, and to provide a press-fit or snap-fit engagement with the perch.

With further reference to FIG. 5, support member 320 of bird feeder perch extension 300 at least partially surrounds bird feeder tube 501. In one implementation, radius of support member 320 is approximately the same as the radius of bird feeder tube 501, such that support member 320 is in contact with the outer surface of bird feeder tube 501.

This combination of mounting cavity 360 and support member 320 is adapted or configured to stabilize the bird feeder perch extensions such that the perch bodies remain substantially horizontal, relative to the base of the bird feeder.

With reference to FIGS. 3B and 4B, in another bird feeder perch extension 400 comprises an elongated perch body 410 and an attachment structure 480 is shown.

Perch body 410 defines a tip 430 at one end, a base 412 at the substantially longitudinally opposite second end, and an outer surface 450 that provides a landing surface to allow one or more birds to rest and position themselves for feeding.

Attachment structure 480 comprises a connector member 482 and an optional, substantially semi-circular support member 420. In other implementations, optional support member 420 may define a curve shape with a non-zero curvature. A first end 481 of connector member 482 is coupled to perch body 410 proximate perch body base 412.

Connector member 482 is at least partially hollow, and defines a mounting cavity 460 open at connector member base 440. As discussed in detail below, mounting cavity 460 has a shape that is adapted or configured to fit at least partially over a bird feeder perch, such as the prior art perches 40 and 80 in FIGS. 1 and 2, respectively.

A first end 422 of support member 420 is coupled to connector member 482 proximate connector member base 440. In one implementation, support member 420 may be removably coupled to connector member 482 with a snap-fit or press-fit engagement. As discussed in detail below, support member 420 is sized to fit at least partially around a bird feeder seed tube, such as seed tubes 34 and 10 in FIGS. 1 and 2, respectively.

Bird feeder perch extension 400 is configured to be attached to, and detached from, a bird feeder, such as the prior art bird feeders 12 and 50 in FIGS. 1 and 2, respectively, described above. As shown in FIG. 5, bird feeder perch extension 400 is removably coupled to bird feeder 500 at perch location 520. Note that the particular bird feeder used in this example is not a limitation, and that the bird feeder perch extensions may be adapted for use with tubular bird feeders of varying length and diameter having protruding perches. In addition, and as described above, support member 420 is optional, such that the bird feeder perch extensions may also be adapted for use with non-tubular bird feeders having protruding perches.

With further reference to FIG. 5, the perch at location 520 is at least partially contained within the mounting cavity 460 of bird feeder perch extension 400. In one implementation, the interior length of mounting cavity 460 is sufficient to contain substantially the entire length to the perch at location 520, such that connector member base 440 is in contact with the outer surface of bird feeder tube 501.

In addition, in one implementation, mounting cavity 460 is adapted or configured to have a shape that is substantially similar to the perch at location 520, such that the perch fits closely or snugly within the mounting cavity. Mounting cavity 460 furthers defines an internal circumference that is slightly larger than the external circumference of the perch, such that the perch fits closely or snugly within the mounting cavity.

In one implementation, mounting cavity 460 defines an oblong shape, and extends through substantially the entire length of connector member 482, such that perch body 410 may be inserted through one end of the mounting cavity 460 and a bird feeder perch, such as the prior art perches 40 and 80, may be inserted through the longitudinally opposite end of the mounting cavity 460. In additional one implementation, the proximate ends of the perch body 410 and the bird feeder perch may be removably coupled within the mounting cavity.

In other implementations, perch body 410 may further comprise ribs, knurls or other protuberances, similar to the protuberances 362 shown in FIG. 3A, to further secure the fit between the mounting cavity and the perch, and to provide a press-fit or snap-fit engagement with the perch.

With further reference to FIG. 5, support member 420 of bird feeder perch extension 400 at least partially surrounds bird feeder tube 501. In one implementation, the radius of support member 420 is approximately the same as the radius of bird feeder tube 501, such that support member 420 is in contact with the outer surface of bird feeder tube 501.

This combination of mounting cavity 460 and attachment structure 480 is adapted to stabilize the bird feeder perch extensions such that the perch bodies remain substantially horizontal, relative to the base of the bird feeder.

With reference to FIGS. 6A, 6B and 6C, another bird feeder perch extension 600 comprises an elongated perch body 610 that defines a tip 630 at a first end, a base 640 at the longitudinally opposite end, and an outer surface 650 that provides a landing surface to allow one or more birds to rest and position themselves for feeding is shown.

Perch body 610 further defines a longitudinal, substantially U-shaped mounting channel or groove 660 that extends along at least a portion of the underside of the perch body, and is open at least at the base 640. Mounting channel 660 has a shape that is adapted or configured to fit at least partially over a bird feeder perch, such as the prior art perches 40 and 80 in FIGS. 1 and 2, respectively.

Bird feeder perch extension 600 is configured to be attached to, and detached from, a bird feeder, such as the prior art bird feeders 12 and 50 in FIGS. 1 and 2, respectively. As shown in FIG. 6C, bird feeder perch extension 600 is removably coupled to bird feeder 500 at perch location 530. Note that the particular bird feeder used in this example is not a limitation, and that bird feeder perch extensions may be adapted to many types of bird feeders having protruding perches.

With further reference to FIG. 6C, the perch at location 530 is at least partially contained within mounting channel 660. In one implementation, the interior length of mounting channel 660 is sufficient to contain substantially the entire length of the perch at location 530, such that the base 640 of perch body 610 is in contact with the outer surface of the bird feeder tube 501.

In addition, in an example implementation, a portion of mounting channel 660 proximate the base 640 is fitted with nibs or projections, such as projections 662 shown in FIG. 6A, to provide a snap-fit or press-fit when the perch is inserted into the mounting channel.

In one implementation, perch bodies 310, 410 and 610 have a generally cylindrical, branch-like shape and are constructed of plastic, although neither is a limitation of the shape or material.

In other implementations, perch bodies 310, 410 and 610 may be constructed of wood or metal, and outer surfaces 350, 450 and 650 may have a wood-like texture. In other implementations, perch bodies 310, 410 and 610 may have a substantially linear shape, or a forked shape, although neither are limitations the shape. Perch bodies 310, 410 and 610 may be 3 to 12 inches in length although these are not limitations of the length.

Figure 7A:
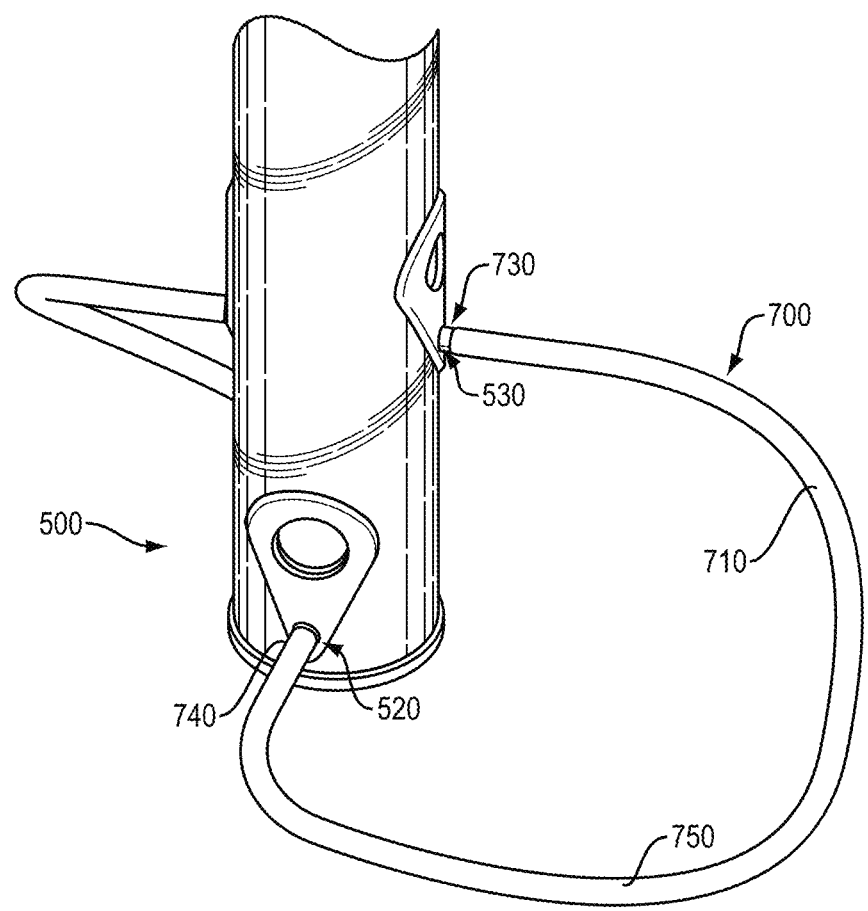
FIG. 7A is a perspective view of another bird feeder extension mounted on a bird feeder.
Figure 7B:
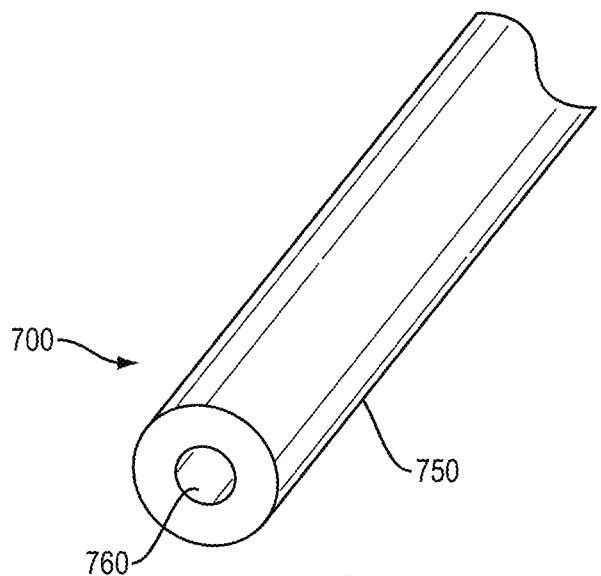
FIG. 7B is a partial perspective view of the bird feeder perch extension of FIG. 7A.

With reference to FIGS. 7A and 7B, in another implementation, bird feeder perch extension 700 comprises an elongated perch body 710 that defines a first end 730, a longitudinally opposite second end 740, and an outer surface 750 that provides a landing surface to allow a bird to move away from the feeder port while it opens and consumes the seed, or to position itself for feeding.

Perch body 710 further defines a longitudinal, substantially circular-shaped mounting channel 760 that extends along at least a portion of the interior of the perch body, and is open at least at the first end 730 and the second end 740. Mounting channel 760 has a shape that is adapted or configured to fit over a bird feeder perch, such as the prior art perches 40 and 80 in FIGS. 1 and 2, respectively, to provide a press-fit when the perch is inserted into the mounting channel.

Bird feeder perch extension 700 is configured to be attached to, and detached from, a bird feeder, such as the prior art bird feeders 12 and 50 in FIGS. 1 and 2, respectively. Specifically, perch extension 700 is configured to be removably coupled to two perch locations to provide a variety of loop-shaped landing areas. As shown in FIG. 7B, first end 730 of bird feeder perch extension 700 is removably coupled to bird feeder 500 at perch location 530, and second end 740 of bird feeder perch extension 700 is removably coupled to bird feeder 500 at perch location 520. Note that the particular bird feeder used in this example is not a limitation, and that bird feeder perch extensions may be adapted to many types of bird feeders having protruding perches.

With further reference to FIG. 7A, the perch at location 530 is at least partially contained within mounting channel 760 proximate first end 730, and the perch at location 520 is at least partially contained within mounting channel 760 proximate second end 740. In one implementation, the interior length of mounting channel 760 is sufficient to contain substantially the entire length of the perches at locations 530 and 520.

In one implementation, perch body 710 has a generally cylindrical shape, is constructed of plastic, and is sufficiently pliable to allow the perch extension 700 to be coupled to any two perches on a prior art bird feeder, although neither is a limitation of the shape or material. In other implementations, perch body 710 may have a textured surface, and may be 6 to 18 inches in length, although these are not limitations of the length.

With reference to FIGS. 8A-10C, another example of a bird feeder perch extension 800 is shown. The extension 800 comprises an elongated perch body 810 that defines a tip 830 at a first end, a base 840 at the longitudinally opposite end, and an outer surface 850 that provides a landing surface to allow one or more birds to rest and position themselves for feeding. The outer surface 850 may be smooth or have an ornamental textured surface such as a surface imitating bark or a tree limb. Similarly, the body 810 can include one or more ornamental features such as angles, textures, protrusions, bends, elbows, depressions, or the like. The body 810 can be made from a solid material such as, but not limited to, plastic, rubber, ceramic, wood, and/or metal.

Figure 8A:
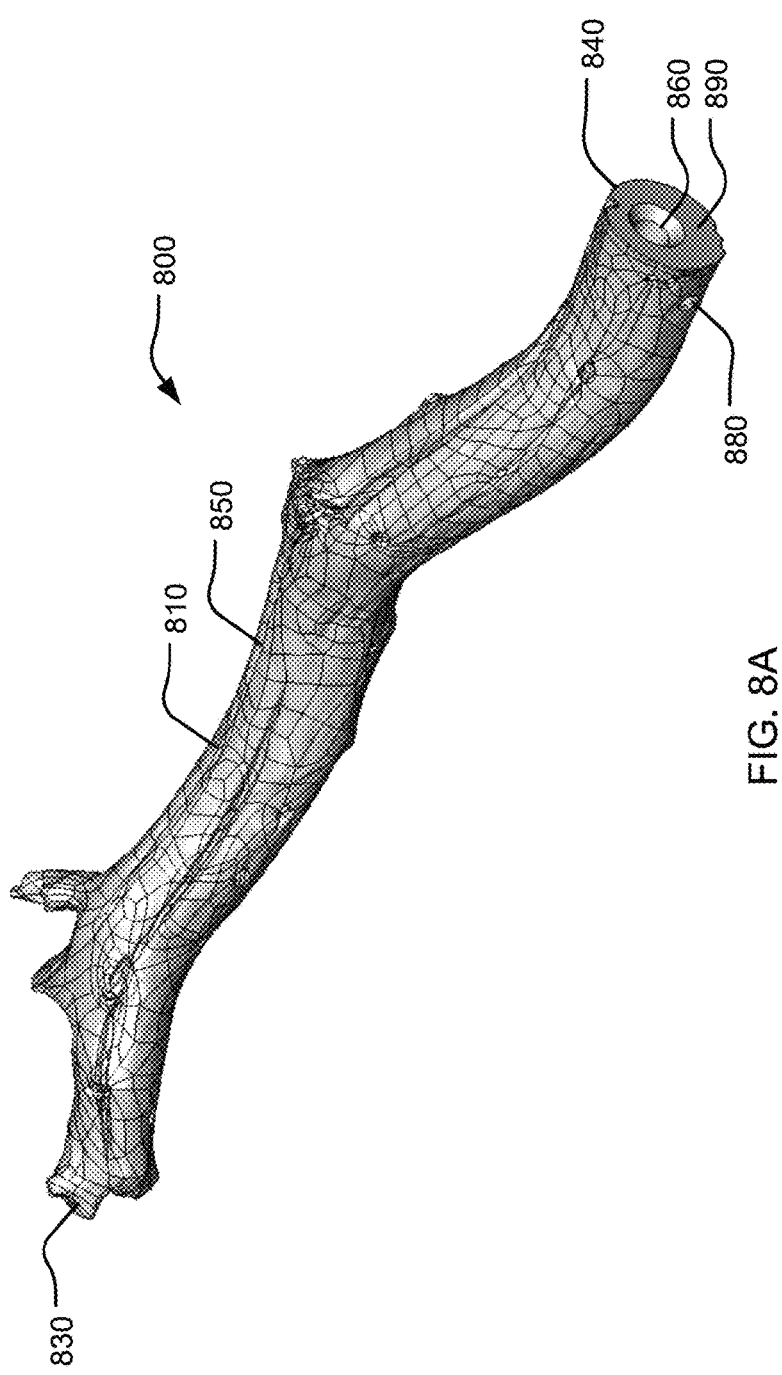
FIG. 8A is an isometric view of another bird feeder perch extension.
Figure 8B:
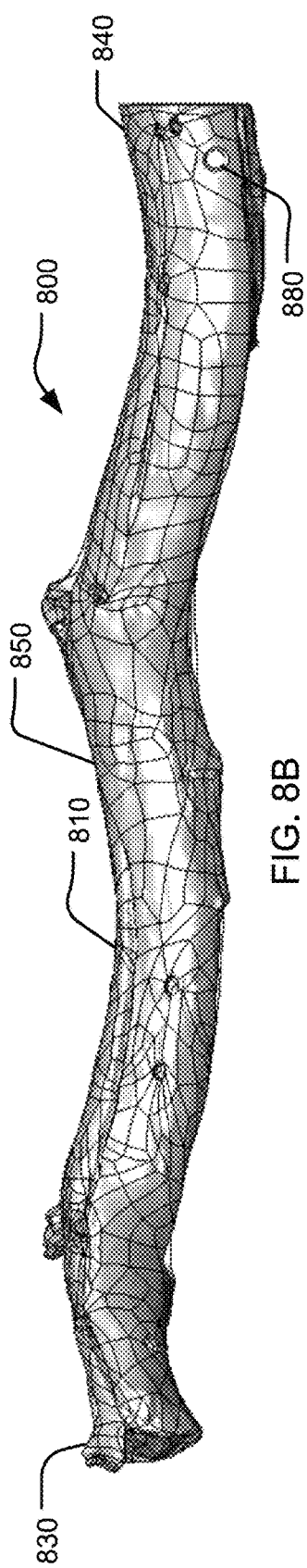
FIG. 8B is a front view of the bird feeder perch extension of FIG. 8A.
Figure 11A:
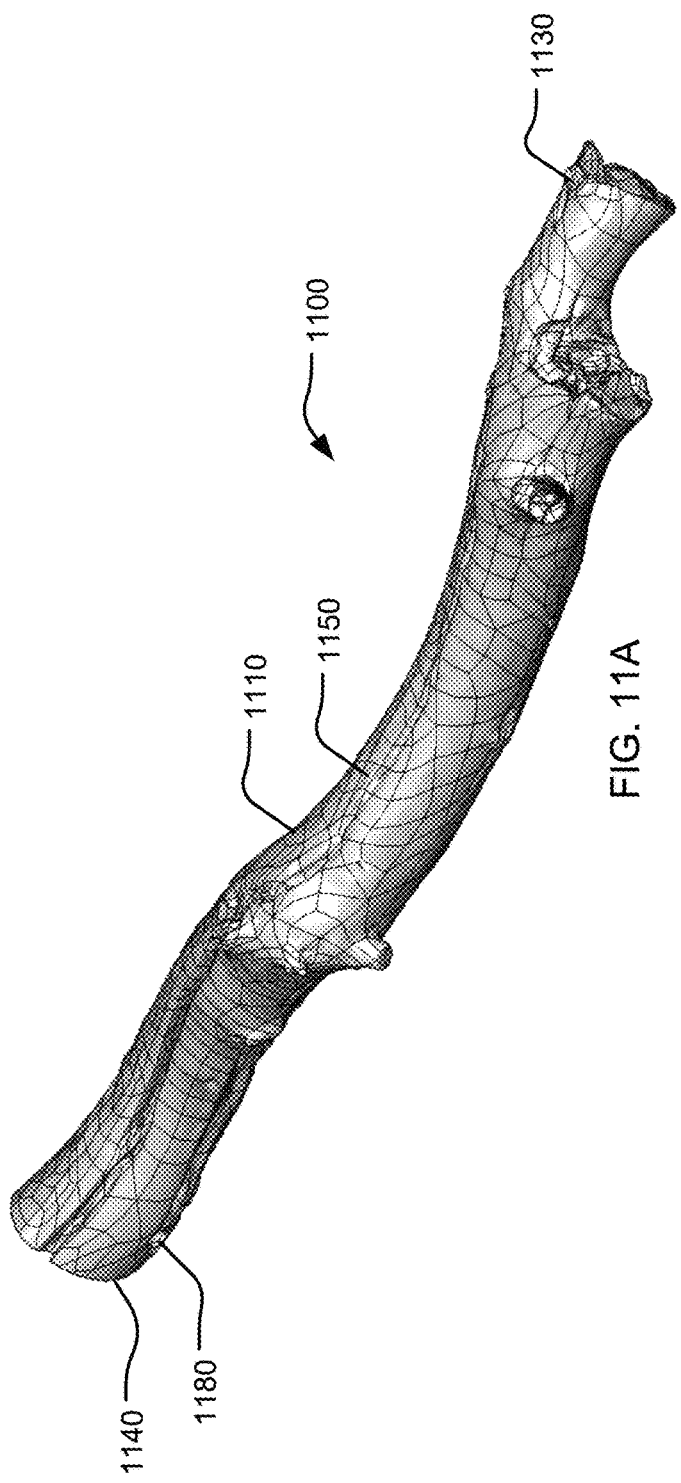
FIG. 11A is an isometric view of another bird feeder perch extension.
Figure 11B:
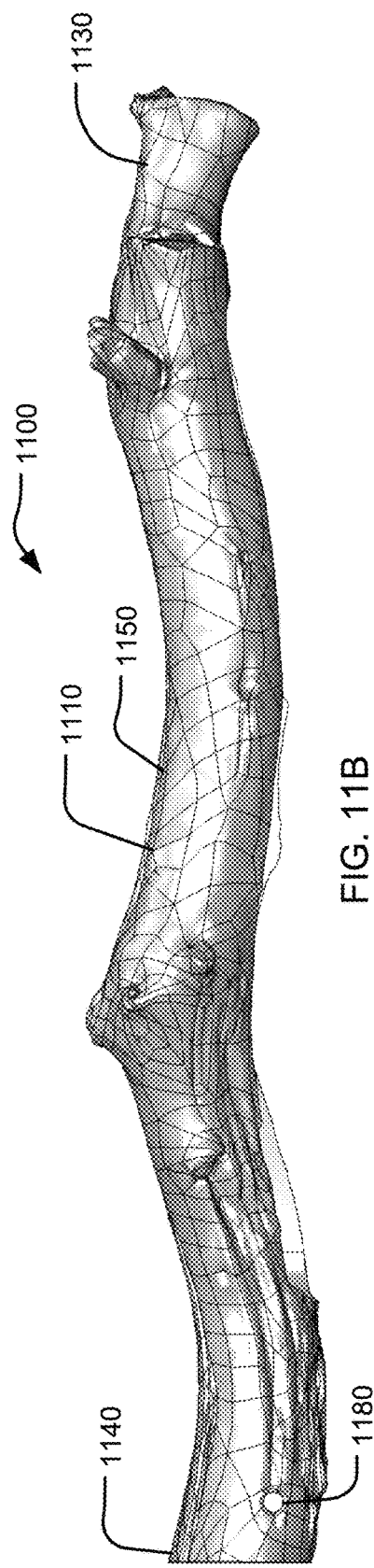
FIG. 11B is a front view of the bird feeder perch extension of FIG. 11A.
Figure 16:
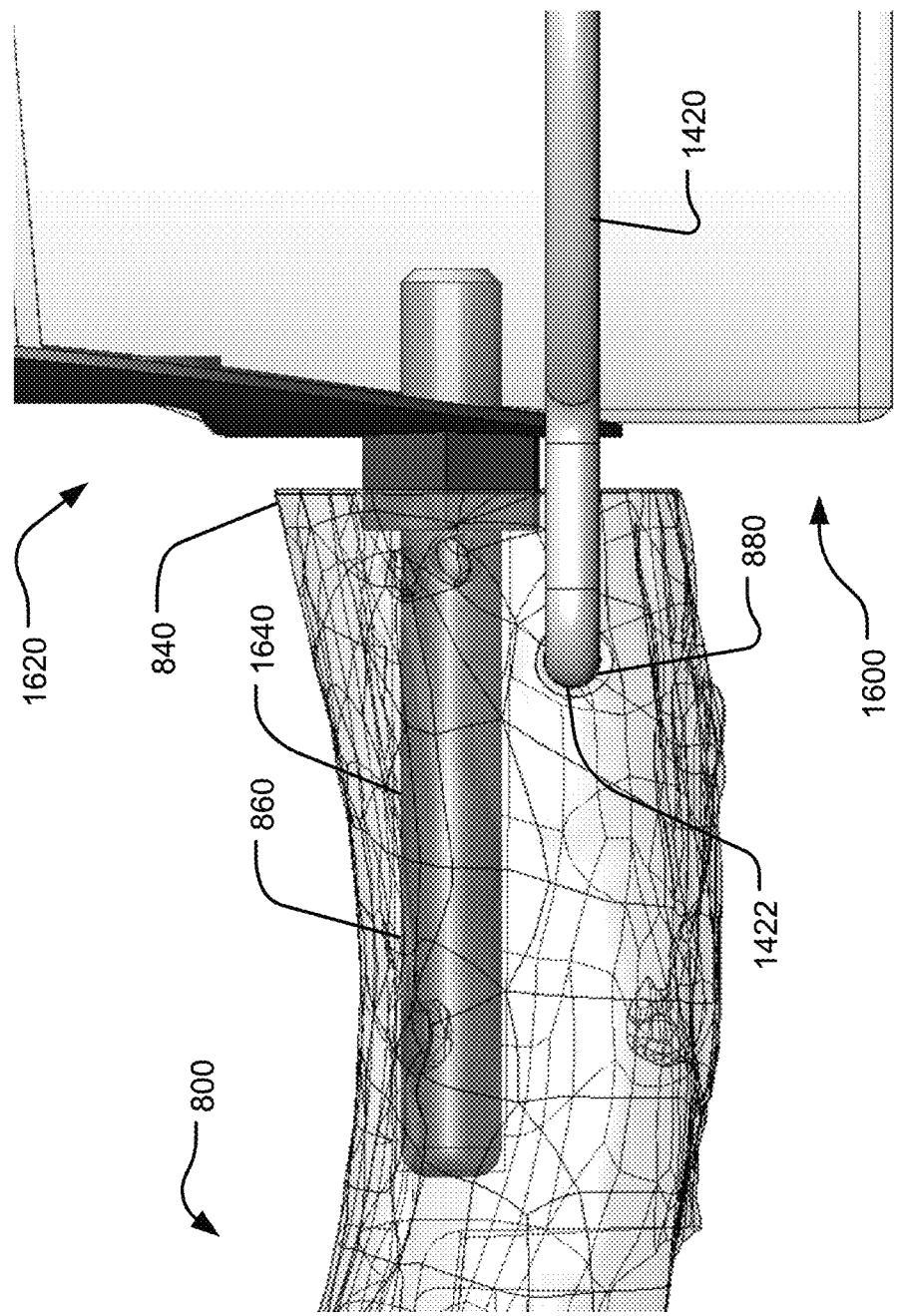
FIG. 16 is a partial front view of the extension of FIG. 8A mounted onto an example birdfeeder.

As shown in FIGS. 8A and 10A, the base 840 has a planar surface 890 perpendicular to the body 810. A mounting cavity 860 extends into the planar surface 890 and may be generally parallel to a length of the body 810. The mounting cavity 860 has a shape that is adapted or configured to fit at least partially over a bird feeder perch 1640, as shown in FIG. 16. The body 810 may also include a depression 812, as shown in FIG. 9A, which extends from near the tip 830 to near the base 840, and is spaced away from the mounting cavity 860. The depression 812 may lower the overall weight for the extension 800 and/or facilitate manufacturing. A length of the extension 800 extends the length of a perch 1640 and increases the surface area. The extended length of the perch 1640 may encourage a bird to perch on the extension 800 for an extended period of time as the bird as an increased surface area on which to move on. In one example, the length of the extension 800 is greater than the length of the perch 1640. In another example, the length of the perch 1640 is greater than the length of the extension 800. An aperture 880, visible in FIGS. 8A, 8B, 9A, and 10A, extends through the body 810 and is space from and perpendicular to the mounting cavity 860. The aperture 880 has a shape that sized to receive a support member 1420, which will be discussed further below. In the illustrated example, the aperture 880 is shown extending through the body 810, though in other examples, the aperture 880 may only extend partially into the body 810.

With reference to FIGS. 11A-13C, another bird feeder perch extension 1100 is shown. The extension 1100 comprises an elongated perch body 1110 that defines a tip 1130 at a first end, a base 1140 at the longitudinally opposite end, and an outer surface 1150 that provides another landing surface to allow one or more birds to rest and position themselves for feeding. The outer surface 1150 may be smooth or have an ornamental textured surface such as a surface imitating bark. Similarly, the body 1110 can include one or more ornamental features such as angles, textures, protrusions, bends, elbows, depressions, or the like. The body 1110 can be made from a solid material.

Figure 13A:
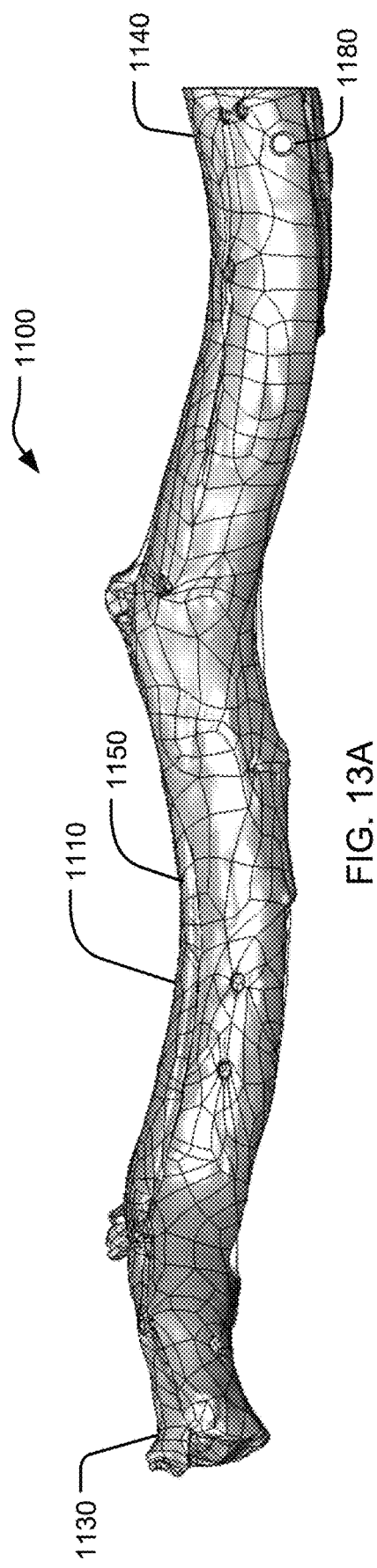
FIG. 13A is a back view of the bird feeder perch extension of FIG. 11A.
Figure 13C:
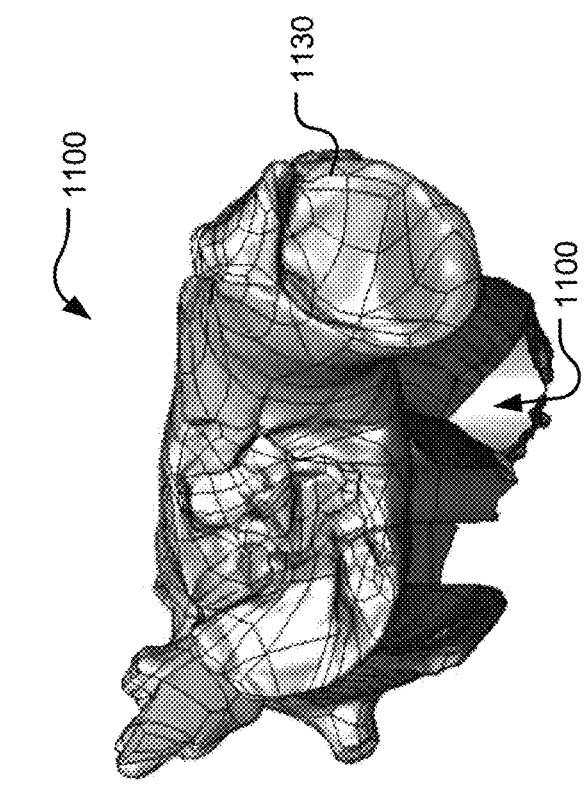
FIG. 13C is a right view of the bird feeder perch extension of FIG. 11A.
Figure 13B:
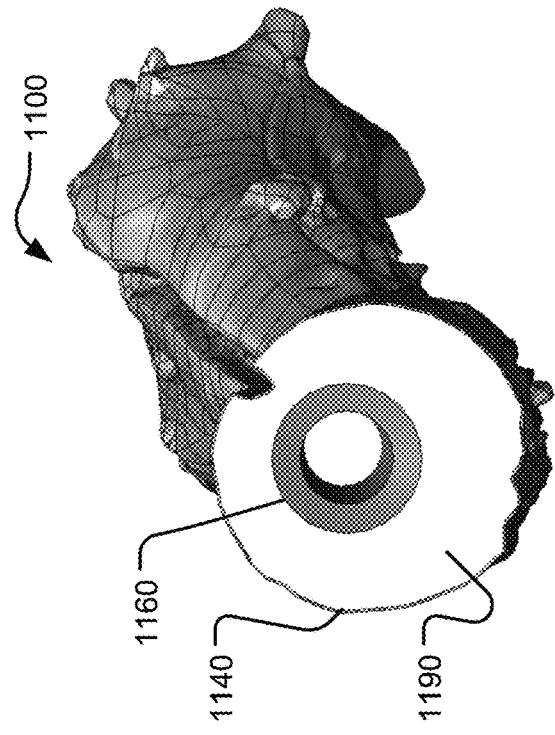
FIG. 13B is a left view of the bird feeder perch extension of FIG. 11A.
Figure 14A:
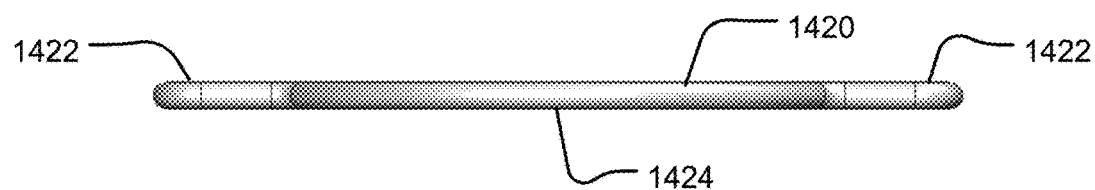
FIG. 14A is a front view of another support member.
Figure 14B:
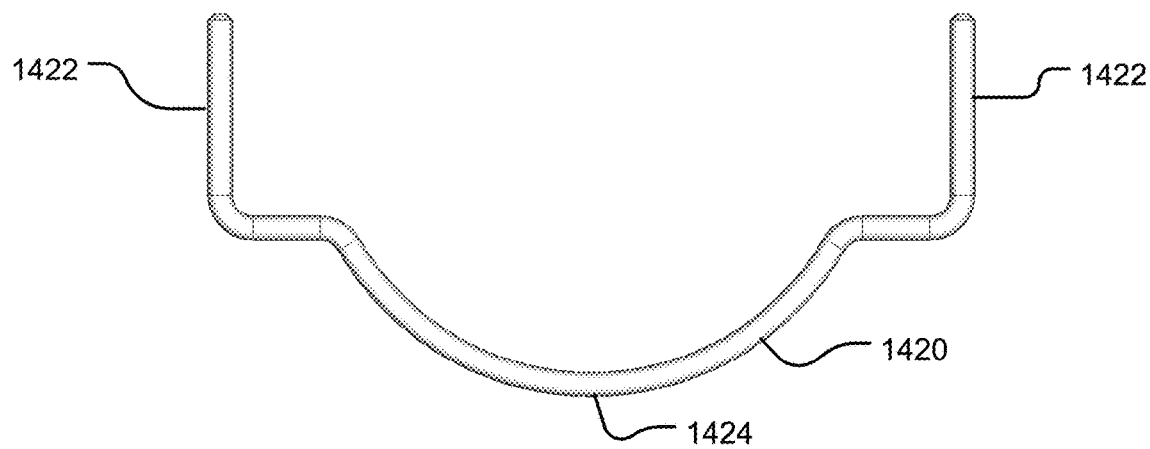
FIG. 14B is a top view of the support member of FIG. 14A.
Figure 14C:
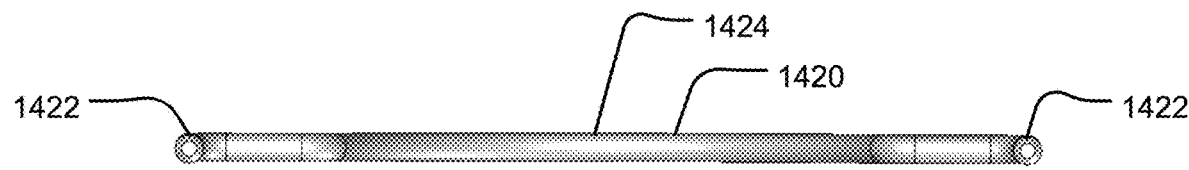
FIG. 14C is a rear view of the support member of FIG. 14A.
Figure 15A:
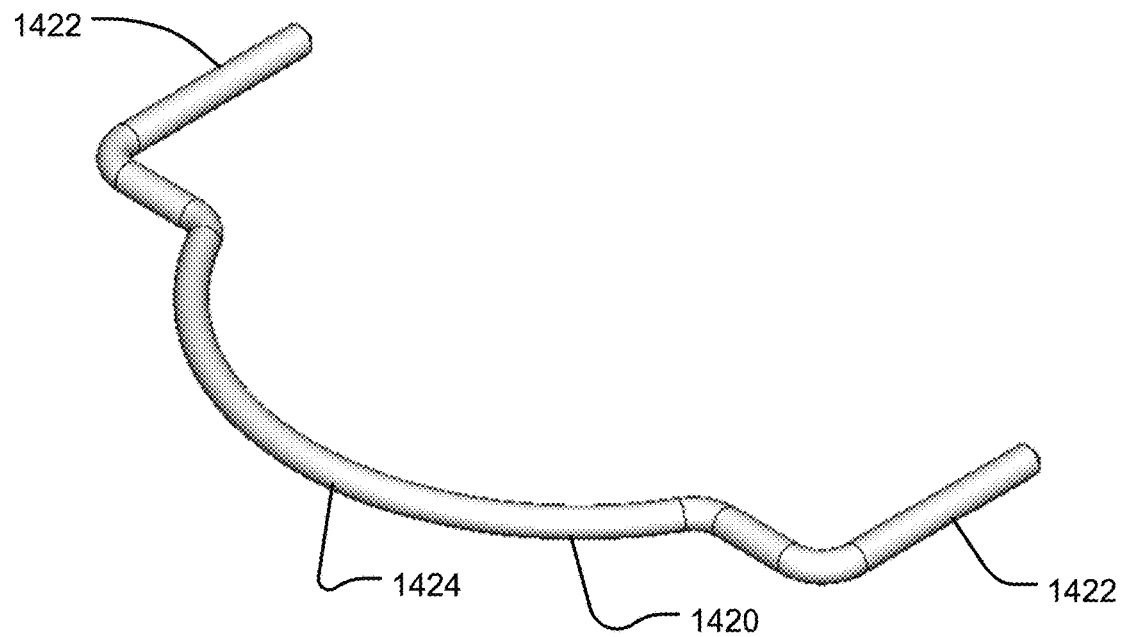
FIG. 15A is an isometric view of the support member of FIG. 14A.
Figure 15B:
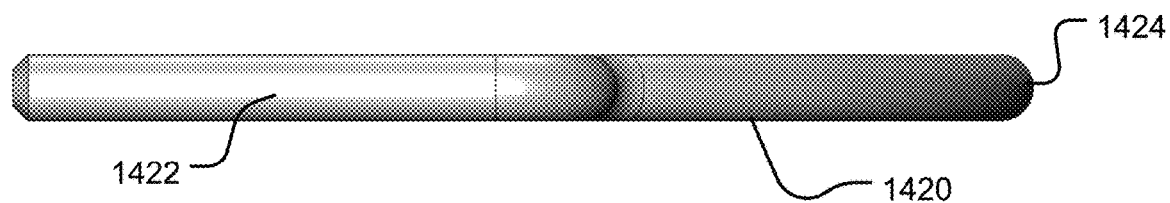
FIG. 15B is a left side view of the support member of FIG. 14A.

As shown in FIG. 13B, the base 1140 has a planar surface 1190 perpendicular to the body 1110. A mounting cavity 1160 extends into the planar surface 1190 and is generally parallel to the body 1110. The mounting cavity 1160 has a shape that is adapted or configured to fit at least partially over the bird feeder perch 1640, shown in FIG. 16. The body 1110 may also include a depression 1112, as shown in FIG. 12A, which extends from near the tip 1130 to near the base 1140, and is spaced away from the mounting cavity 1160. A length of the extension 1100 extends the length of a perch 1640. The extended length of the perch 1640 may encourage a bird to perch on the extension 1100 for an extended period of time. In one example, the length of the extension 1100 is greater than the length of the perch 1640. In another example, the length of the perch 1640 is greater than the length of the extension 1100. An aperture 1180, visible in FIGS. 11A, 11B, 12A, and 13A, extends through the body 1110 and is space from and perpendicular to the mounting cavity 1160. The aperture 1180 has a shape that sized to receive the support member 1420. In the illustrated example, the aperture 1180 is shown extending through the body 1110, though in other examples, the aperture 1180 may only extend partially into the body 1110.

Figure 17:
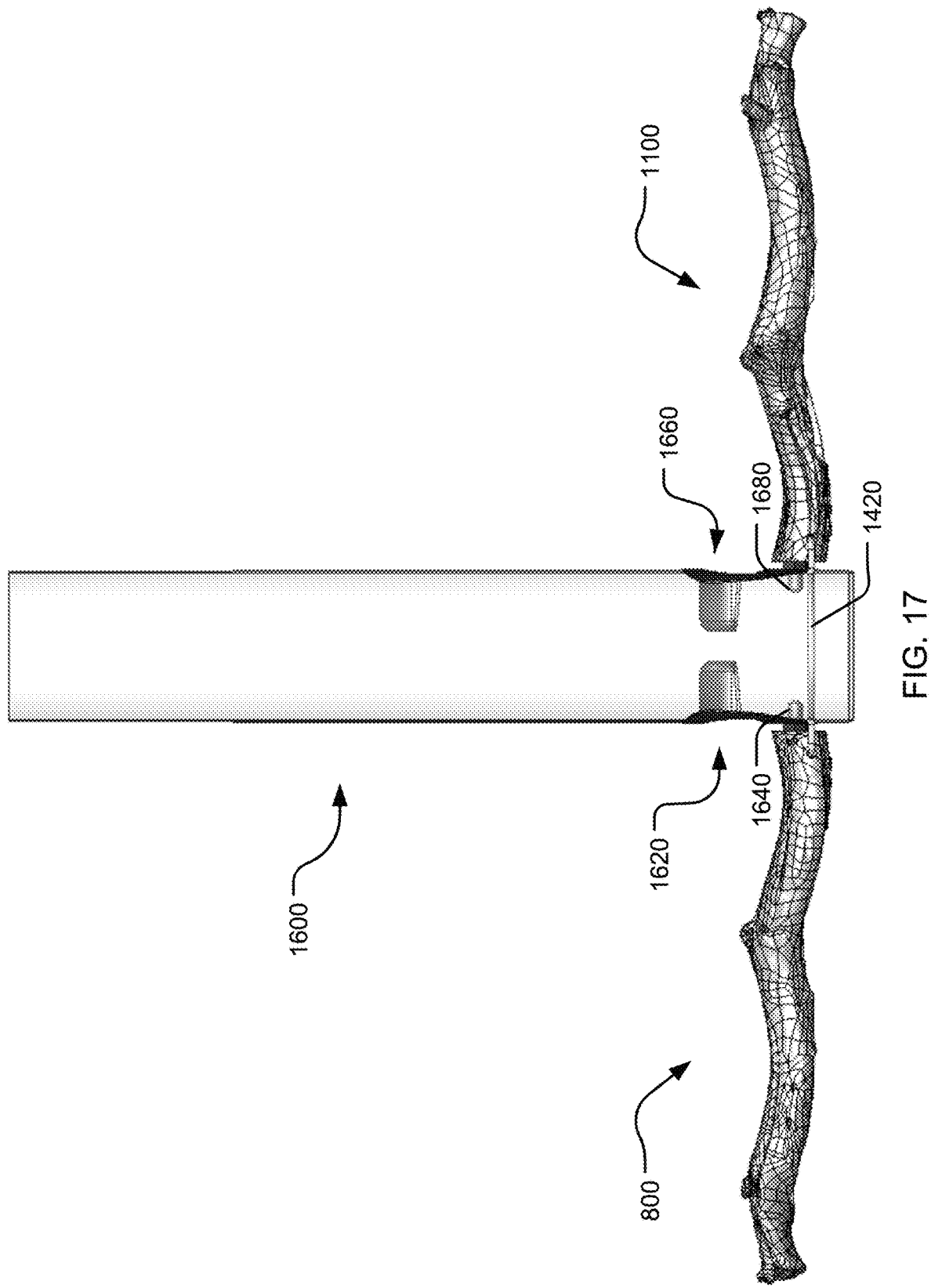
FIG. 17 is a front view of the extension of FIG. 8A and the extension of FIG. 11A mounted onto the bird feeder of FIG. 16.

Turning to FIGS. 14A-15B, an example of the support member 1420 is shown. The support member 1420 includes a center portion 1424 extending into a pair of opposing hooks 1422. In the illustrated example, the center portion 1424 is circular and sized to fit at least partially around an example bird feeder 1600, as shown in FIG. 17. Stated differently, the radius of support member 1420 is approximately the same as the radius of a tube of the bird feeder 1600, such that support member 1420 is in contact with an outer surface of the tube of the bird feeder 1600. In other examples, the center portion 1424 may be other sizes and shapes such as, but not limited to, triangular, star shaped, rectangular, or the like. Each of the pair of hooks 1422 may be removably coupled to perch bodies 800, 1100 with a snap-fit or press-fit engagement, as shown in more detail in FIG. 16.

FIG. 16 is a partial front view of the extension 800 mounted onto the perch 1640. As shown on the example bird feeder 1600, the perches 1640, 1660 extend from apertures 1620, 1660 from which a bird can access bird seed stored within the bird feeder 1600. In the illustrated example, the perch 1640 extends into mounting cavity 860, which is cylindrically shaped to receive the perch 1640. The mounting cavity 860 can have a diameter slightly smaller than the perch 1640 to create a press fit engagement. One of the pair of hooks 1422 is also shown as received into aperture 880, and spaced below the mounting cavity 860 and perch 1640. Similarly, the perch 1680 extends into mounting cavity 1160 of extension 1100 and the extension 1100 may be secured in the same way, or a different way, as extension 800. The other hook 1422 can be received in aperture 1180, as shown in FIG. 17.

Figure 18:
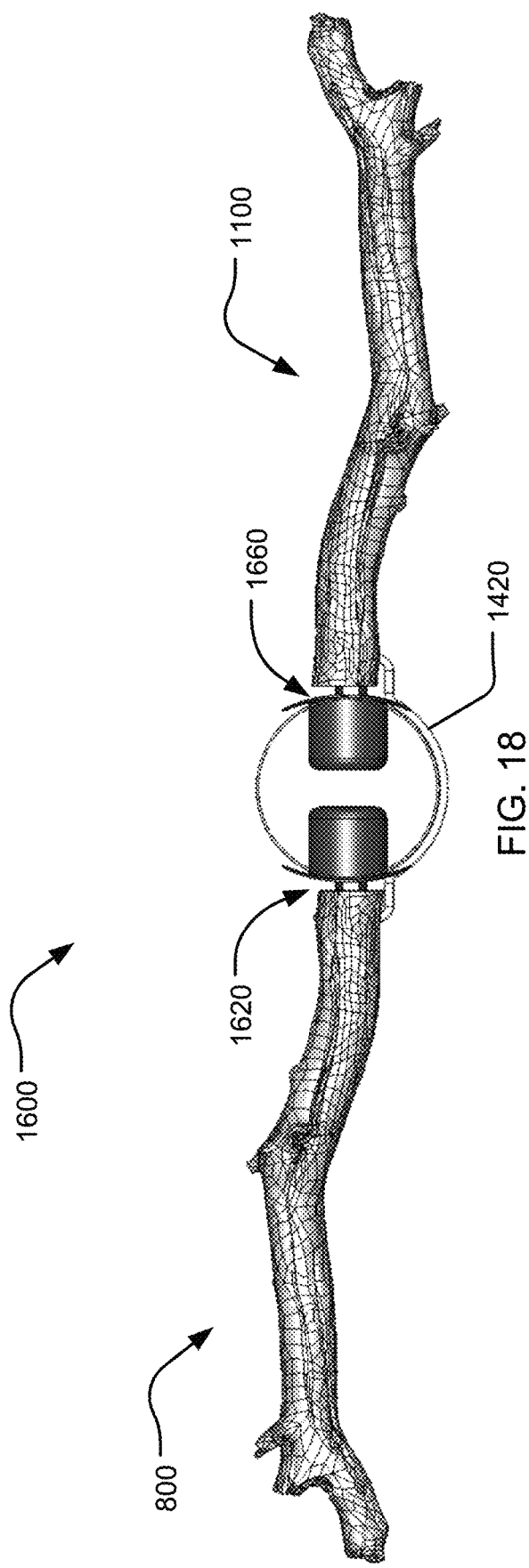
FIG. 18 is a top view of the bird feeder of FIG. 17.
Figure 19:
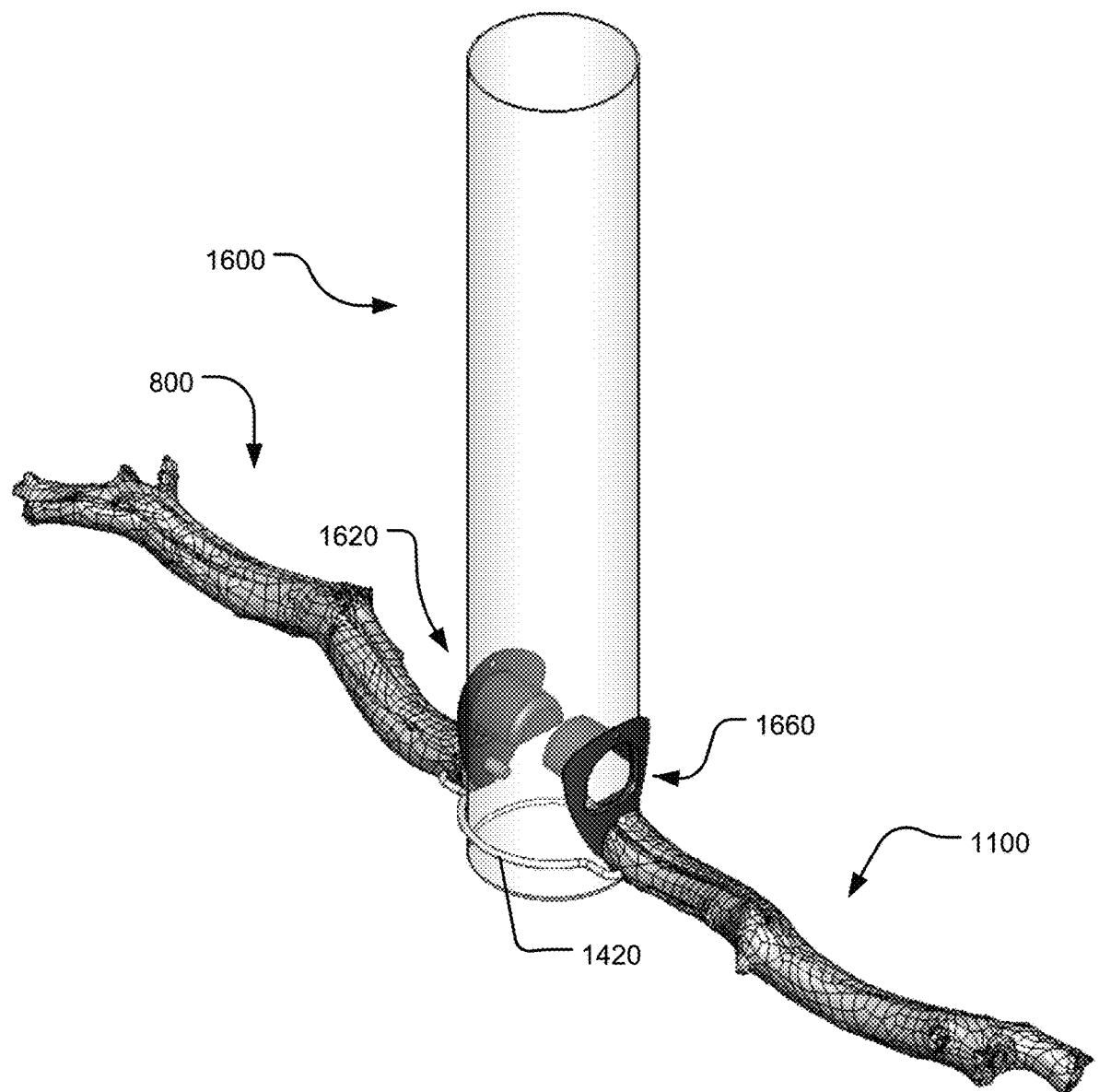
FIG. 19 is an isometric view of the bird feeder of FIG. 17.

FIGS. 17, 18, and 19, illustrate a front view, a top view, and an isometric view, respectively, of extensions 800, 1100 mounted on the bird feeder 1600. Each extension 800, 1100 can be mounted to each perch 1640, 1680, independent of the support member 1420. In the illustrated implementation, the extensions 800, 1100 are mounted on opposing sides of the bird feeder 1600, though the extensions 800, 1100 can be mounted in any configuration. In another example, only one of the extensions 800, 1100 is mounted on the bird feeder 1600. In one example implementation, the support member 1420 is releasably coupled to both extensions 800, 1100 and partially surrounds the bird feeder 1600. This combination of cavities 860, 1160 and support member 1420 are adapted or configured to provide additional stabilization to the extensions 800, 1100 by transferring some force generated by a perched bird from the extensions 800, 1100 and perches 1640, 1680 to the support member 1420, and thus relieving some of the torque experienced by the extensions 800, 1100 and perches 1640, 1680.

Figure 20:
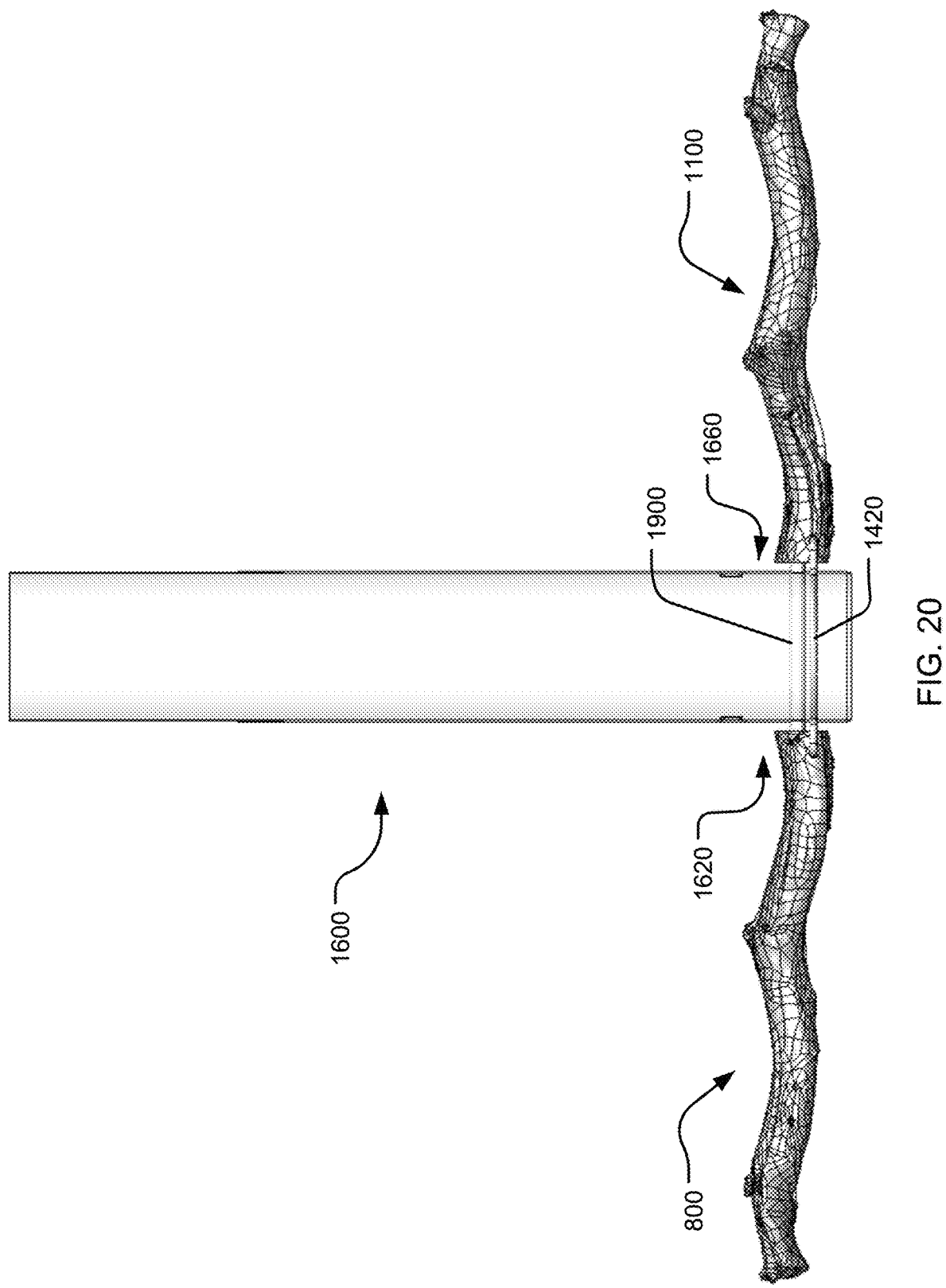
FIG. 20 is a front view of the bird feeder of FIG. 17 with a perch support bar.
Figure 21:
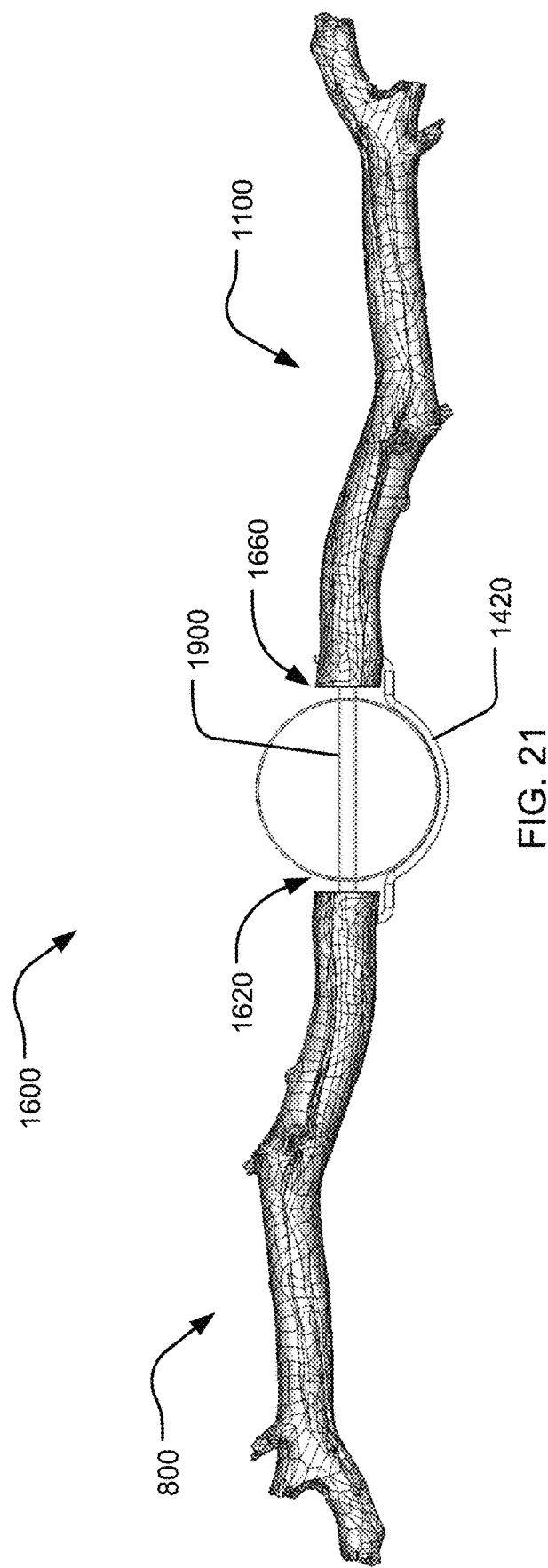
FIG. 21 is a top view of the bird feeder of FIG. 17 with the perch support bar of FIG. 20.
Figure 22:
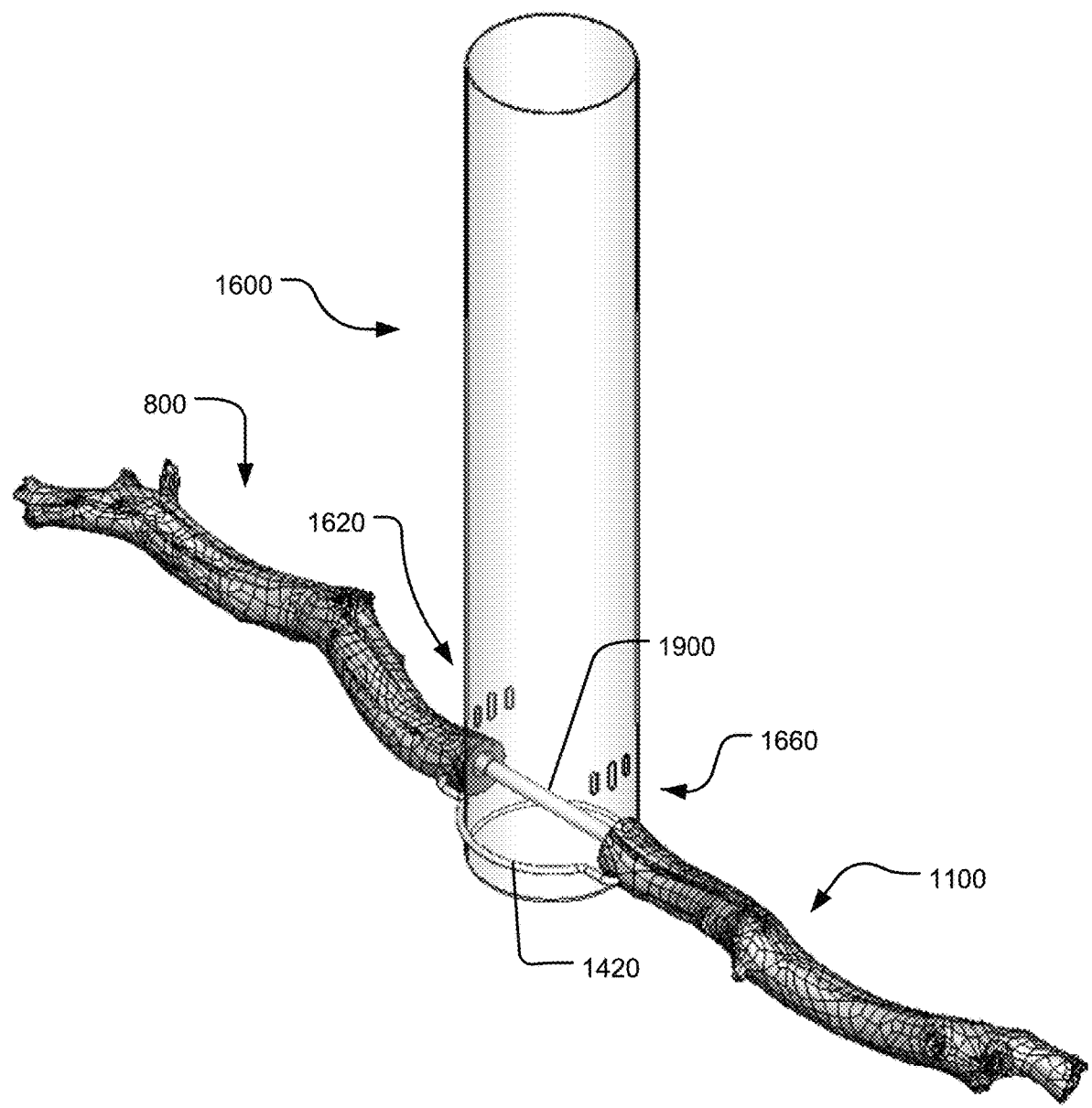
FIG. 22 is an isometric view of the bird feeder of FIG. 17 with the perch support bar of FIG. 20.

Turning to FIGS. 20, 21, and 22, a front view, a top view, and an isometric view of the bird feeder 1600 with a perch support bar 1900 are shown. Instead of perches 1640, 1680, a perch support bar 1900 may extend through the bird feeder 1600 and each end of the perch support bar 1900 can be received in cavities 860, 1160. The perch support bar 1900 can provide additional stabilization to the bird feeder perch extensions 800, 1100 similar to the support member 1420 by transferring some force generated by a perched bird from the extensions 800, 1100 and perches 1640, 1680 to the perch support bar 1900. Although not shown, the perch support bar 1900 can be used with or without the support member 1420.

While the disclosure has been described with reference to several example implementations, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular implementations disclosed as the best mode contemplated for carrying out this disclosure, but that the disclosure will include all implementations falling within the scope of the appended claims.

What is claimed is:

1. A system for perch extension for a bird feeder including a perch having a perch surface area, the system comprising:
   an elongated body extending along a length from a first end to a second end;
   an opening defined in the elongated body at the second end;
   a mounting cavity defined in the elongated body, the mounting cavity in communication with the opening and extending at least partially along the length of the elongated body an aperture defined in the elongated body, the aperture being engageable to a hook of a support member adapted to extend about a reservoir of the bird feeder; and
   an external surface extending about the length of the body, the external surface having an extended surface area, the elongated body engageable to the perch in an extended arrangement including the perch extending through the opening into the mounting cavity, the extended arrangement forming a landing surface area including at least the external surface area, the landing surface area being greater in size than the perch surface area.

2. The system of claim 1, wherein the mounting cavity is completely enclosed by the external surface.

3. The system of claim 1, wherein the elongated body is removable from the perch.

4. The system of claim 1, wherein the length of the elongated body extends linearly.

5. The system of claim 1, wherein the length of the elongated body extends along one or more contours.

6. The system of claim 1, wherein the external surface is smooth.

7. The system of claim 1, wherein the external surface is at least one of textured or non-uniform.

8. The system of claim 1, wherein the external surface has a shape mimicking a tree branch.

9. The system of claim 1, wherein the support member is adapted to connect the elongated body to a second elongated body.

10. The system of claim 1, wherein the support member is removeable from the aperture.

11. The system of claim 1, wherein the opening is defined in a face at the second end, the face extending transverse to the length of the elongated body.

12. A method for perch extension for a bird feeder including a perch having a perch surface area, the method comprising:
    disposing an elongated body relative to the perch, the elongated body extending along a length from a first end to a second end, an external surface extending about the length of the body, the external surface having an extended surface area;
    receiving the perch into a mounting cavity through an opening defined in the elongated body at the second end, the mounting cavity defined in the elongated body, the mounting cavity in communication with the opening and extending at least partially along the length of the elongated body; and
    engaging the elongated body engageable to the perch in an extended arrangement, the extended arrangement including the perch extending through the opening into the mounting cavity, the extended arrangement forming a landing surface area including at least the external surface area, the landing surface area being greater in size than the perch surface area receiving a support member in an aperture of the elongated body, the support member connecting the elongated body to at least one of a reservoir of the bird feeder or a second elongated body.

13. The method of claim 12, further comprising:
    disengaging the elongated body from the perch by removing the perch from the mounting body through the opening.

* * * * *